(12) United States Patent
Nomura et al.

(10) Patent No.: US 10,417,666 B2
(45) Date of Patent: Sep. 17, 2019

(54) DIGITAL SIGNAGE CONTROL DEVICE, DIGITAL SIGNAGE CONTROL METHOD, AND RECORDING MEDIUM

(71) Applicant: TOYOTA JIDOSHA KABUSHIKI KAISHA, Toyota-shi, Aichi-ken (JP)

(72) Inventors: Masakazu Nomura, Nagoya (JP); Masato Endo, Nagakute (JP); Naoki Yamamuro, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/055,748

(22) Filed: Aug. 6, 2018

(65) Prior Publication Data

US 2019/0050907 A1 Feb. 14, 2019

(30) Foreign Application Priority Data

Aug. 10, 2017 (JP) ................. 2017-155829

(51) Int. Cl.
*G08G 1/0967* (2006.01)
*G06Q 30/02* (2012.01)
*G06K 9/00* (2006.01)

(52) U.S. Cl.
CPC ..... *G06Q 30/0266* (2013.01); *G06K 9/00369* (2013.01); *G06K 9/00791* (2013.01); *G06K 9/00838* (2013.01)

(58) Field of Classification Search
CPC ....... G08G 1/096716; G08G 1/096775; G08G 1/0104; G08G 1/0112; G08G 1/096725; G08G 1/096783; G08G 1/0133; G08G 1/096; G08G 1/096758; G08G 1/096791; G08G 1/096827; G08G 1/123; G08G 1/161; G08G 1/0129; G08G 1/0141; G08G 1/096733; G08G 1/096741; G08G 1/09675; G08G 1/096838; G08G 1/202; G08G 1/22; G08G 1/0116; G08G 1/052; G08G 1/09; G08G 1/095; G08G 1/0962; G08G 1/0965; G08G 1/096708; G08G 1/096866;
(Continued)

(56) References Cited

U.S. PATENT DOCUMENTS 5,247,518 A * 9/1993 Takiyasu ............. H04J 3/08
370/466
5,539,645 A * 7/1996 Mandhyan ........... G08G 1/0104
340/905

(Continued)

FOREIGN PATENT DOCUMENTS

JP 2011-070629 A 4/2011
JP 2011-210238 A 10/2011
(Continued)

*Primary Examiner* — Daniel Previl
(74) *Attorney, Agent, or Firm* — Hunton Andrews Kurth LLP

(57) ABSTRACT

A digital signage control device includes: a traffic condition related information acquiring unit configured to acquire the traffic condition related information on traffic conditions near each of a plurality of digital signages; and a display control unit configured to: cause the plurality of digital signages to display advertisement information, and switch a digital signage on which the advertisement information is displayed among the plurality of digital signages based on traffic condition related information.

9 Claims, 12 Drawing Sheets

(58) Field of Classification Search
CPC .... G08G 1/096883; G08G 1/164; G08G 1/20;
G08G 1/012; G08G 1/0145; G08G 1/092;
G08G 1/09623; G08G 1/0967; G08G
1/096811; G08G 1/096844; G08G
1/096872; G08G 1/205; G01C 21/3691;
G01C 21/26; G01C 21/3415; G01C
21/3492; G01C 21/34; G01C 21/3423;
G01C 21/3469; G01C 21/3484; G01C
21/3697; G01C 21/20; G01C 21/32;
G01C 21/3617; G01C 21/3658; G01S
5/0027; G09B 29/10; H04W 4/021;
H04W 4/046; H04W 24/08; H04W 64/00;
H04W 84/12; H04W 24/10; H04W
28/0278; H04W 36/00; H04W 84/10;
H04W 88/02; B60R 1/00; B60R 25/1025;
B60R 11/02; B60R 2300/205; B60R
2300/30; B60R 2325/205; B60R 25/102;
B60R 25/33; B60W 2550/20; B60W
2550/402; B60W 2720/10; B60W 50/14;
B60W 10/18; B60W 10/20; B60W
2420/42; B60W 30/18163; G06Q 30/018;
G06Q 30/0214; G06Q 30/0252; G06Q
30/0255; G08B 25/016; G10L 15/22;
G10L 13/00; G10L 13/02; G10L 13/043;
G10L 15/30; G10L 2015/223; H04M
1/72519; H04M 2250/06; Y02T 10/52;
Y10T 477/50; Y10T 477/623; B60K
2350/2013; B60K 2350/352; B60K
2350/96; B60K 35/00; B60Q 1/346;
B60Q 9/008; G06F 17/27; G06F 17/2785;
G06K 19/06037; G06K 9/00798; G06K
9/00805; G06K 9/209; G07B 15/063;
G09F 15/0006; G09F 9/33; H04J
11/0093; H04L 43/00; H04L 47/29; H04L
5/001; H04L 5/0098; H04L 67/12; H04N
5/23296; H04N 5/345; H04N 5/3454;
H04N 5/3535; H04N 5/3696; H04N
7/183
USPC ....... 340/905, 907, 995, 928, 901, 903, 904,
340/933, 988, 991, 994
See application file for complete search history.

(56) References Cited

U.S. PATENT DOCUMENTS

| | | | | |
|---|---|---|---|---|
| 6,130,626 | A * | 10/2000 | Kane | G08G 1/0104 235/384 |
| 2002/0035430 | A1* | 3/2002 | Yano | G01C 21/3415 701/411 |
| 2002/0173907 | A1* | 11/2002 | Ando | G08G 1/20 701/410 |
| 2004/0077330 | A1* | 4/2004 | Kusayanagi | B60R 25/1025 455/404.1 |
| 2010/0063729 | A1* | 3/2010 | Goto | G01C 21/26 701/533 |
| 2011/0199231 | A1* | 8/2011 | Loiselle | G09F 9/33 340/907 |
| 2012/0112928 | A1* | 5/2012 | Nishimura | G08G 1/07 340/909 |
| 2016/0180709 | A1* | 6/2016 | Rider | G06Q 30/0266 340/905 |

FOREIGN PATENT DOCUMENTS

| | | |
|---|---|---|
| JP | 2012-123727 A | 6/2012 |
| JP | 2015-015031 A | 1/2015 |

* cited by examiner

FIG. 8B

<TARGET>
APPEARING PERIOD: 14 DAYS
IMPRESSION: 500,000 Imp
AUDIENCE ATTRIBUTE: WOMEN IN TWENTIES & WOMEN IN THIRTIES
(30 PERCENT)

FIG. 8C

<PREDICTION (BEFORE TRANSFER)>
APPEARING PERIOD: 14 DAYS
IMPRESSION: 250,000 Imp
AUDIENCE ATTRIBUTE: WOMEN IN TWENTIES & WOMEN IN THIRTIES
(10 PERCENT)

FIG. 8D

<PREDICTION (AFTER TRANSFER)>
APPEARING PERIOD: 14 DAYS
IMPRESSION: 550,000 Imp
AUDIENCE ATTRIBUTE: WOMEN IN TWENTIES & WOMEN IN THIRTIES
(25 PERCENT)

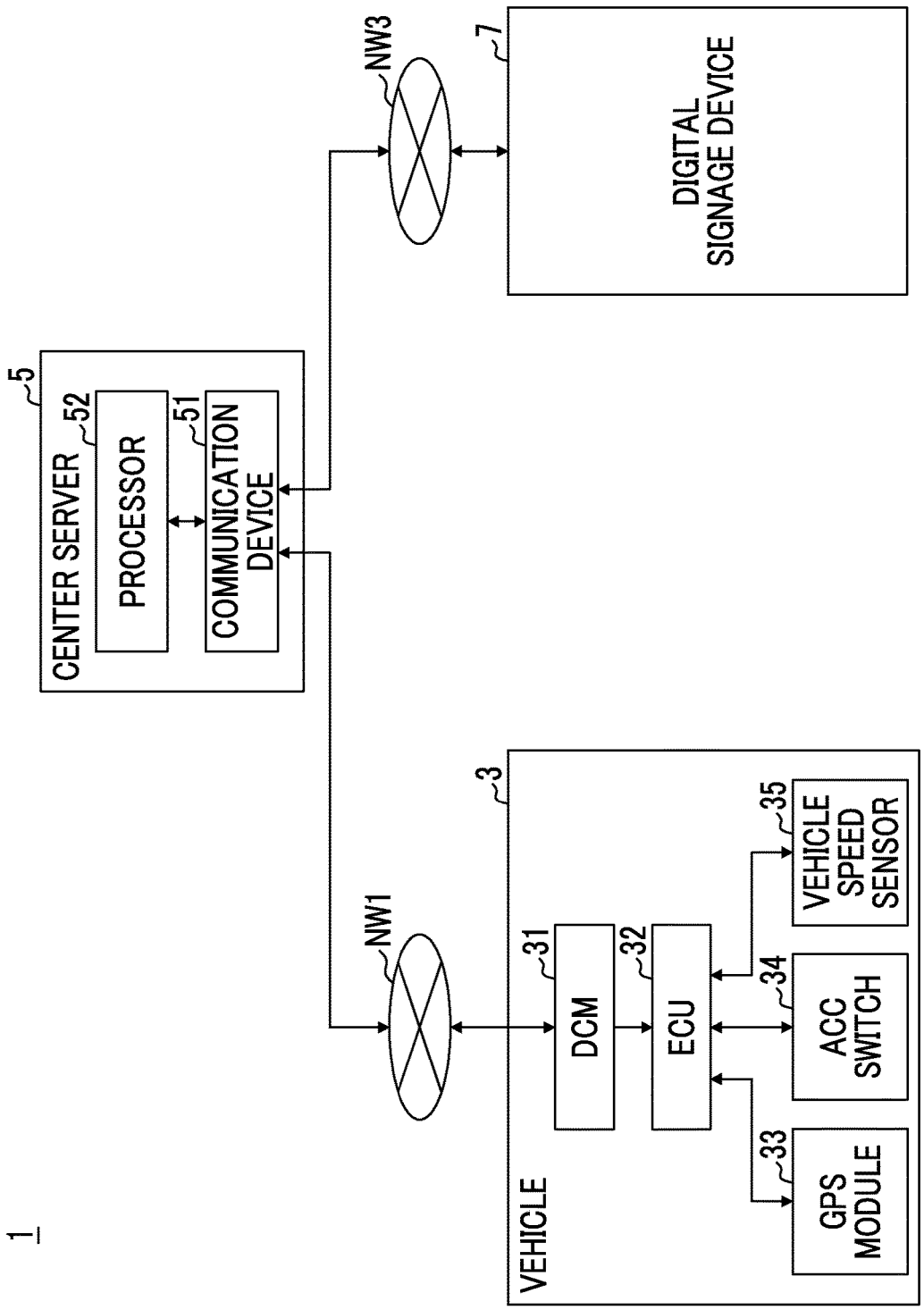

DIGITAL SIGNAGE CONTROL DEVICE, DIGITAL SIGNAGE CONTROL METHOD, AND RECORDING MEDIUM

INCORPORATION BY REFERENCE

The disclosure of Japanese Patent Application No. 2017-155829 filed on Aug. 10, 2017 including the specification, drawings and abstract is incorporated herein by reference in its entirety.

BACKGROUND

1. Technical Field

The disclosure relates to a digital signage control device, a digital signage control method, and a recording medium.

2. Description of Related Art

A digital signage dedicated for occupants of a vehicle including a driver in the vehicle is known (for example, see US Patent Application Publication No. 2016/0180709 (US 2016/0180709 A)).

SUMMARY

However, there is a likelihood that an expected effect of an advertisement which is displayed on a digital signage may not be able to be achieved depending on traffic conditions of a road near the digital signage. For example, when a nearby road from which the digital signage can be seen is closed due to a traffic accident, roadwork, or the like or is subjected to lane restrictions, a traffic volume decreases and thus there is a likelihood that an effect of an advertisement which is displayed on a digital signage will deteriorate.

The disclosure provides a digital signage control device that can achieve an appropriate effect for an advertisement which is displayed on a digital signage.

A digital signage control device according to a first aspect of the disclosure includes: a traffic condition related information acquiring unit configured to acquire the traffic condition related information on traffic conditions near each of a plurality of digital signages; and a display control unit configured to: cause the plurality of digital signages to display advertisement information, and switch a digital signage on which the advertisement information is displayed among the plurality of digital signages based on traffic condition related information.

According to this aspect, the digital signage control device can ascertain, for example, a traffic volume of a road near a digital signage from the traffic condition related information and predict an effect index corresponding to an impression of the digital signage. For example, the digital signage control device can ascertain change of traffic conditions of a road near a digital signage or predict change thereof in the future from the traffic condition related information. Accordingly, the digital signage control device can transfer advertisement information displayed on the digital signage to another digital signage when a predicted value of the effect index is less than an expected standard, when the traffic conditions of the road near the digital signage depart from a range in which the effect is expected to be improved, when such departure therefrom is predicted, or the like. As a result, it is possible to restrain deterioration in advertising effect and to improve an appropriate effect of the advertisement information displayed on the digital signage.

In the aspect, the digital signage control device may further include: a first effect predicting unit configured to calculate a first effect index value indicating an impression of advertisement information displayed on each of the plurality of digital signages over a predetermined display period based on the traffic condition related information. The display control unit may be configured to switch, when the first effect index value of first advertisement information displayed on a first digital signage is less than a predetermined first standard, a digital signage on which the first advertisement information is displayed from the first digital signage to a second digital signage, the first digital signage and the second digital signage being included in the plurality of digital signages, the first effect index value of the first advertisement information displayed on the second digital signage being greater than the first effect index value of the first advertisement information displayed on the first digital signage.

According to this aspect, the digital signage control device can predict the effect index corresponding to an impression of one piece of advertisement information displayed on one digital signage and transfer a display destination of the one piece of advertisement information to another digital signage when the predicted effect index is less than an expected standard. Accordingly, it is possible to restrain deterioration in advertising effect corresponding to an impression and to improve an appropriate effect of the advertisement information displayed on the digital signage.

In the aspect, the traffic condition related information acquiring unit may be configured to acquire the traffic condition related information including traffic volume information of a nearby road which is a road near each of the plurality of digital signages and vehicle speed information of vehicles passing along the nearby road, and the first effect predicting unit may be configured to calculate the first effect index value based on the traffic volume information and the vehicle speed information.

According to this aspect, the digital signage control device can ascertain the number of vehicles which have a person onboard having a likelihood that the person is able to see the digital signage, or the like based on the traffic volume information. In general, as a vehicle speed of a vehicle passing along a nearby road increases, it is more difficult to see the display of a digital signage. On the other hand, the digital signage control device can determine a probability that an occupant of a vehicle passing along a nearby road will be able to see the digital signage or the like based on the vehicle speed information. Accordingly, the digital signage control device can specifically predict an effect index corresponding to an impression based on the traffic volume information and the vehicle speed information.

In the aspect, the digital signage control device may further include: an occupant number information acquiring unit configured to acquire occupant number information on the number of occupants of a vehicle passing along the nearby road. The first effect predicting unit may be configured to calculate the first effect index value based on the occupant number information.

According to this aspect, the digital signage control device can predict the number of occupants of a vehicle passing along a nearby road using the occupant number information in addition to the traffic volume information. Accordingly, the digital signage control device can specifically predict an effect index corresponding to an impression with high accuracy based on the occupant number information in addition to the traffic volume information and the vehicle speed information.

In the aspect, the digital signage control device may further include: a vehicle movement history collecting unit configured to collect a vehicle movement history including position information from each of a plurality of probe vehicles; a terminal movement history collecting unit configured to collect a terminal movement history including position information from a mobile terminal carried by each of a plurality of users of the plurality of probe vehicles; a passing vehicle identifying unit configured to identify a probe vehicle passing along the nearby road among the plurality of probe vehicles based on the vehicle movement history; and an occupant identifying unit configured to identify an occupant of the probe vehicle passing along the nearby road based on the vehicle movement history of the probe vehicle and the terminal movement history of the mobile terminal of the user of the probe vehicle. The traffic condition related information acquiring unit may be configured to acquire the traffic volume information including the number of probe vehicles passing along the nearby road based on an identification result from the passing vehicle identifying unit, and the occupant number information acquiring unit may be configured to acquire the occupant number information including the number of occupants of the probe vehicle passing along the nearby road based on an identification result from the occupant identifying unit.

According to this aspect, the digital signage control device can specifically acquire traffic volume information including the number of probe vehicles passing along a road near a digital signage based on movement histories of a plurality of probe vehicles (vehicle movement histories). The digital signage control device can specifically acquire occupant number information including the number of occupants of a probe vehicle passing along a road near a digital signage by comparing a vehicle movement history of the probe vehicle with a terminal movement history of mobile terminals of occupants of the probe vehicle. Accordingly, the digital signage control device can specifically predict an effect index corresponding to an impression with higher accuracy based on the traffic volume information and the occupant number information.

In the aspect, the digital signage control device may further include: a conspicuousness information acquiring unit configured to acquire conspicuousness information on conspicuousness when each of the plurality of digital signages is seen from the vehicle on the nearby road corresponding to the each of the plurality of digital signages. The first effect predicting unit may be configured to calculate the first effect index value based on the conspicuousness information.

According to this aspect, the digital signage control device can acquire information on conspicuousness (conspicuousness information) when a digital signage is seen from a vehicle such as a relationship between a traveling direction of the vehicle on a nearby road and a direction of a display surface of the digital signage. Accordingly, the digital signage control device can determine a probability or the like that advertisement information of a digital signage will be able to be seen from a vehicle passing along a nearby road based on the conspicuousness information. Accordingly, the digital signage control device can specifically predict an effect index corresponding to an impression with higher accuracy based on the conspicuousness information in addition to the traffic volume information and the vehicle speed information.

In the aspect, the digital signage control device may further include: a vehicle movement history collecting unit configured to collect a vehicle movement history including position information from each of a plurality of probe vehicles; a terminal movement history collecting unit configured to collect a terminal movement history including position information from a plurality of mobile terminals carried by each of a plurality of users of the plurality of probe vehicles; an attribute information storing unit configured to store predetermined attribute information of each of the plurality of users; a passing vehicle identifying unit configured to identify a probe vehicle passing along a nearby road which is a road near each of the plurality of digital signages among the plurality of probe vehicles based on the vehicle movement history; an occupant identifying unit configured to identify an occupant of the probe vehicle passing along the nearby road based on the vehicle movement history of the probe vehicle and the terminal movement history of the mobile terminal of the user of the probe vehicle; an attribute information acquiring unit configured to acquire the attribute information of the user identified by the occupant identifying unit from the attribute information storing unit; and a second effect predicting unit configured to calculate, based on the attribute information acquired by the attribute information acquiring unit, a second effect index value indicating appropriateness of audience attributes for advertisement information displayed on each of the plurality of digital signages over a predetermined display period. The display control unit may be configured to switch, when the second effect index value of third advertisement information displayed on a third digital signage is less than a predetermined second standard, digital signage on which the third advertisement information is displayed from the third digital signage to a forth digital signage, the third digital signage and the forth digital signage being included in the plurality of digital signages, the second effect index value of the third advertisement information displayed on the forth digital signage being greater than the second effect index value of the third advertisement information displayed on the third digital signage.

According to this aspect, the digital signage control device can identify an occupant of a probe vehicle passing along a road near a digital signage based on the vehicle movement history of the probe vehicle and the terminal movement history of the mobile terminal carried by the occupant of the probe vehicle and acquire attribute information of the occupant (for example, sex and age). Accordingly, the digital signage control device can predict an effect index associated with the appropriateness of audience attributes for one piece of advertisement information displayed on one digital signage based on attribute information of an occupant of a probe vehicle passing along a road near the one digital signage and transfer a display destination of the one piece of advertisement information to another digital signage when the predicted effect index is less than an expected standard. Accordingly, it is possible to restrain deterioration in advertising effect associated with the appropriateness of audience attributes and to improve an appropriate effect of the advertisement displayed on the digital signage.

The above-mentioned aspects may be embodied as a digital signage control method and a computer-readable recording medium storing the program.

According to the above-mentioned aspects, it is possible to provide a digital signage control device that can improve an appropriate effect for an advertisement displayed on a digital signage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8B is a diagram illustrating an operation of the advertisement delivery system;

FIG. 8C is a diagram illustrating an operation of the advertisement delivery system;

FIG. 8D is a diagram illustrating an operation of the advertisement delivery system;

FIG. 9 is a diagram schematically illustrating an example of a configuration of an advertisement delivery system according to a second embodiment;

DETAILED DESCRIPTION OF EMBODIMENTS

Hereinafter, embodiments of the disclosure will be described with reference to the accompanying drawings.

First Embodiment

[Configuration of Advertisement Delivery System]

First, a configuration of an advertisement delivery system 1 according to a first embodiment will be described below with reference to FIGS. 1 to 4.

Figure 1:
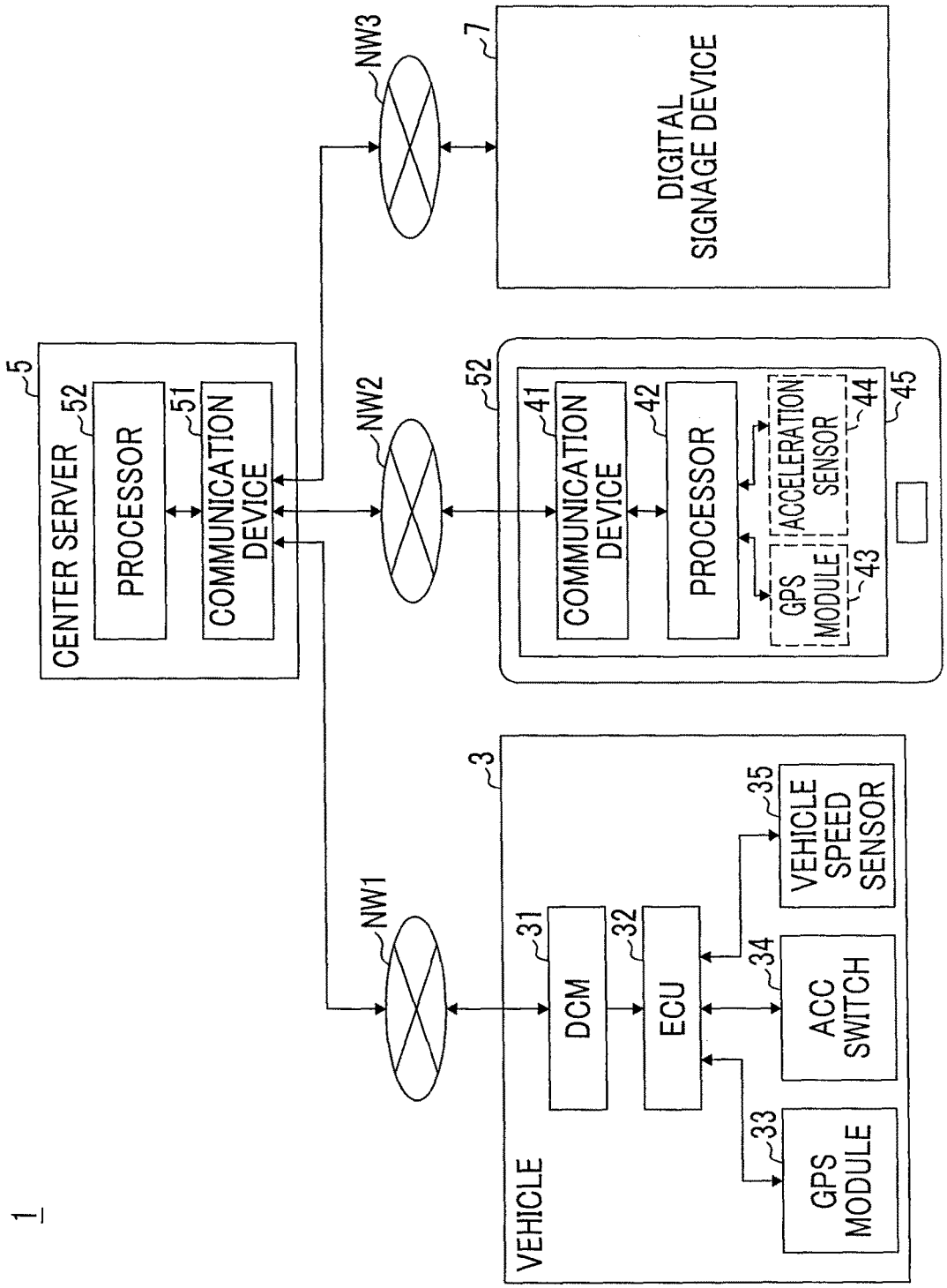
FIG. 1 is a diagram schematically illustrating an example of a configuration of an advertisement delivery system according to a first embodiment.
Figure 2:
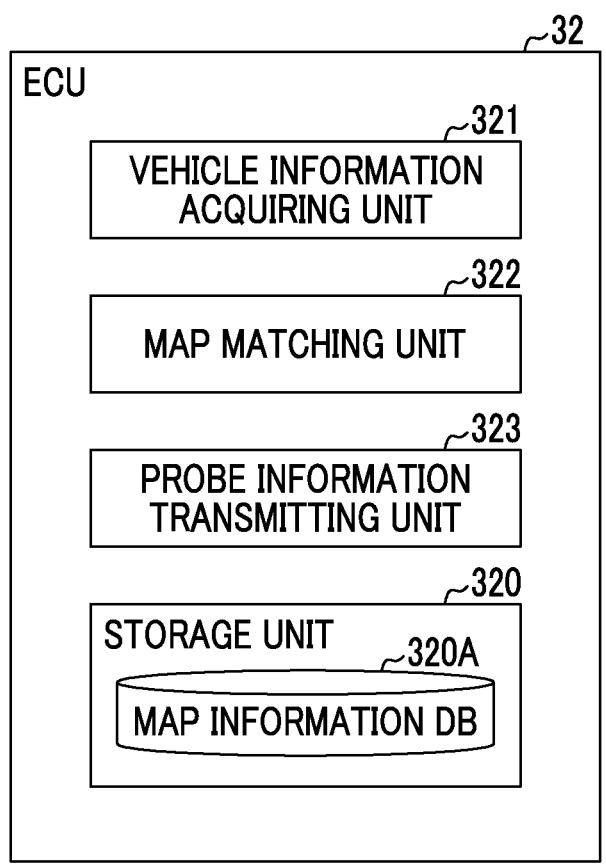
FIG. 2 is a functional block diagram illustrating an example of a functional configuration of a vehicle (an ECU) according to the first embodiment.
Figure 3:
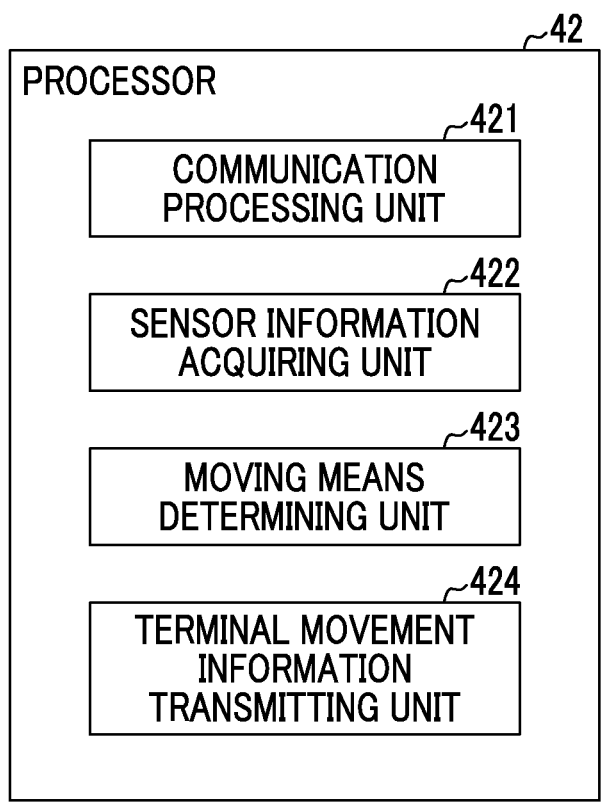
FIG. 3 is a functional block diagram illustrating an example of a functional configuration of a mobile terminal (a processor) according to the first embodiment.
Figure 4:
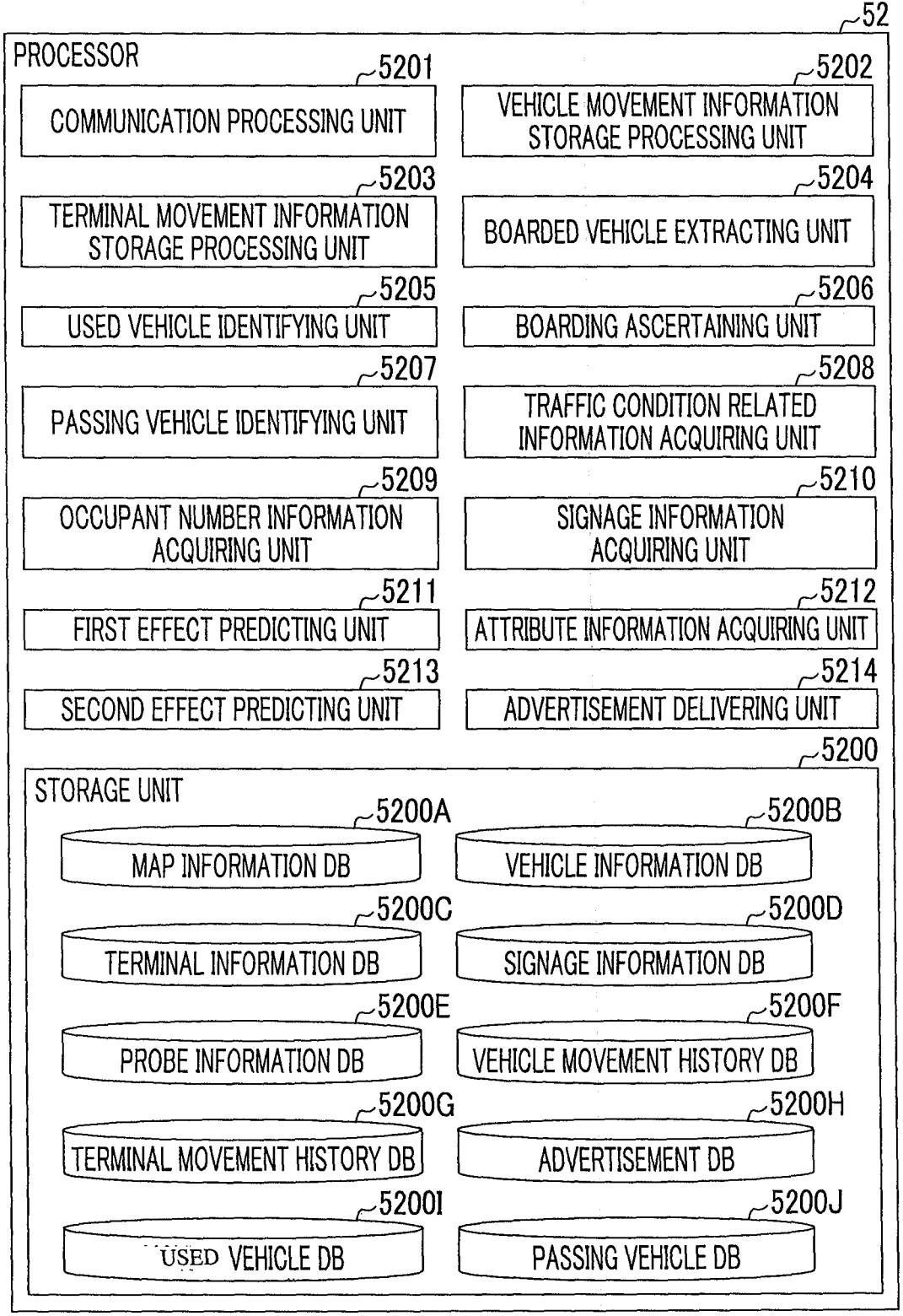
FIG. 4 is a functional block diagram illustrating an example of a functional configuration of a central server (a processor) according to the first embodiment.

FIG. 1 is a diagram schematically illustrating an example of a configuration of the advertisement delivery system 1 according to this embodiment. FIG. 2 is a functional block diagram illustrating an example of a functional configuration of a vehicle 3 according to this embodiment. FIG. 3 is a functional block diagram schematically illustrating an example of a functional configuration of a mobile terminal 4 according to this embodiment. FIG. 4 is a functional block diagram illustrating an example of a configuration of a central server 5 according to this embodiment.

The advertisement delivery system 1 includes a plurality of vehicles 3, a plurality of digital signage devices 7 that are installed near an arbitrary road, for example, on a side of the road or above the road, and a central server 5 that is communicatively connected to the plurality of vehicles 3 and the plurality of digital signage devices 7. The advertisement delivery system 1 delivers advertisement information for occupants of the vehicles 3 located on a road near the installation position of each digital signage device 7 to the digital signage devices 7.

Each vehicle 3 has substantially the same configuration as other vehicles 3 associated with the advertisement delivery system 1. Each mobile terminal 4 has substantially the same configuration as other mobile terminals 4 in association with the advertisement delivery system 1. Each digital signage device 7 has substantially the same configuration as other digital signage devices 7 in association with the advertisement delivery system 1. Accordingly, in the drawings, one vehicle 3, one mobile terminal 4, and one digital signage device 7 are representatively illustrated. The same is true of FIG. 9, except that the mobile terminal 4 is omitted.

The vehicle 3 includes a data communication module (DCM) 31, an electronic control unit (ECU) 32, a global positioning system (GPS) module 33, an ACC switch 34, and a vehicle speed sensor 35.

The DCM 31 is a device that bidirectionally communicates with the central server 5, for example, via a predetermined communication network NW1 including a mobile phone network with a plurality of base stations as terminals, an Internet network, or the like (which is hereinafter true of communication networks NW2 and NW3). The DCM 31 is connected to various ECUs including an ECU 32 such that these are able to communicate with each other via an onboard network such as a controller area network (CAN).

The ECU 32 is an electronic control unit that performs control of a variety of predetermined functions in the vehicle 3. For example, the ECU 32 may perform a process of acquiring a variety of information (vehicle information) on a state of the vehicle 3 (a vehicle state), a state of an occupant of the vehicle 3, and a state of surroundings of the vehicle 3 and uploading the acquired vehicle information as probe information to the central server 5 via the DCM 31. The functions of the ECU 32 may be embodied by arbitrary hardware, arbitrary software, or a combination thereof, and the ECU 32 may be constituted mainly by a microcomputer including a central processing unit (CPU), a random access memory (RAM), a read only memory (ROM), an auxiliary storage device, and an input-output interface (I/O). The ECU 32 includes a vehicle information acquiring unit 321, a map matching unit 322, and a probe information transmitting unit 323 as functional units which are embodied, for example, by causing the CPU to execute one or more programs stored in the ROM or the auxiliary storage device. The ECU 32 includes a storage unit 320 which is a storage area defined in an internal memory such as the auxiliary storage device. A map information database (DB) 320A is stored in the storage unit 320.

Some functions of the ECU 32 may be assigned to one or more other ECUs.

The vehicle information acquiring unit 321 acquires vehicle information input from the GPS module 33, the ACC switch 34, and the vehicle speed sensor 35 from a buffer in the RAM. Specifically, the vehicle information acquiring unit 321 acquires position information of the vehicle 3 which is input from the GPS module 33. The vehicle information acquiring unit 321 acquires ON/OFF signals of the ACC switch 34 which are input from the ACC switch 34.

The vehicle information acquiring unit 321 acquires information on a vehicle speed (vehicle speed information) of the vehicle 3 which is input from the vehicle speed sensor 35.

The map matching unit 322 identifies a road link corresponding to the position information of the vehicle 3, that is, a road link on which the vehicle 3 is currently located, based on the map information DB 320A stored in the storage unit 320 and the position information of the vehicle 3 which is acquired by the vehicle information acquiring unit 321. For example, a plurality of road links constituting a road network included in the map information DB 320A may be defined in identification information, that is, link identifiers (ID), in advance. The map matching unit 322 identifies a link ID of the road link on which the vehicle 3 is currently located.

The map information DB 320A includes geographic information system (GIS) data including nodes corresponding to crossings, road links corresponding to roads between neighboring crossings, that is, connecting the nodes, and lines or polygons corresponding to planimetric features such as buildings or roads. In the following description, the same is true of a map information DB 5200A which will be described later.

The probe information transmitting unit 323 generates probe information including a variety of vehicle information acquired by the vehicle information acquiring unit 321, road link IDs identified by the map matching unit 322, and time information corresponding to the variety of vehicle information. Then, the probe information transmitting unit 323 transmits the generated probe information to the central server 5 via the DCM 31. The probe information includes the position information of the vehicle 3, the time information corresponding to the position information of the vehicle 3, the link ID corresponding to the position information of the vehicle 3, and information on movement of the vehicle 3 (vehicle movement information) including information on starting and stopping of the vehicle 3. Hereinafter, in this embodiment, information (ACC-ON information) indicating that the ACC switch 34 has been switched from an OFF state to an ON state is employed as the information on starting of the vehicle 3, and information (ACC-OFF information) indicating that the ACC switch 34 has been switched from the ON state to the OFF state is employed as the information on stopping of the vehicle 3.

The probe information which is transmitted from the vehicle 3 to the central server 5 may not include time information corresponding to a variety of vehicle information. In this case, the central server 5 can use a time at which the vehicle movement information has been transmitted from the vehicle 3, a time at which the vehicle movement information has been received by the central server 5, an estimated time corresponding to the position information of the vehicle 3 which is calculated from these times, or the like as the time information corresponding to a variety of vehicle information. Then, the central server 5 can add the time information to the probe information as time information corresponding to the variety of vehicle information in the probe information received from the vehicle 3.

The GPS module 33 receives GPS signals which are transmitted from three or more satellites, preferably, four or more satellites, above the vehicle 3 and measures the position of the vehicle 3 in which the GPS module 33 is mounted. The GPS module 33 is communicatively connected to the ECU 32 or the like via a one-to-one communication line or an onboard network such as a CAN, and the measured position information of the vehicle 3 is input to the ECU 32 or the like.

The ACC switch 34 switches an accessory power source of the vehicle 3 to ON/OFF states in response to a predetermined operation which is performed by an occupant such as a driver of the vehicle 3. For example, the ACC switch 34 may be switched to ON/OFF states in response to an operation of a power switch (a button type switch for operating the ACC switch 34 and an ignition switch (an IG switch)) which is provided in an instrument panel near a steering wheel for a driver seat in the vehicle. The ACC switch 34 is communicatively connected to the ECU 32 or the like via a one-to-one communication line or an onboard network such as a CAN, and a state signal thereof (an ON signal/OFF signal) is input to the ECU 32.

The vehicle speed sensor 35 is an existing detector that detects a vehicle speed of the vehicle 3. The vehicle speed sensor 35 is communicatively connected to the ECU 32 or the like via a one-to-one communication line or an onboard network such as a CAN, and the vehicle speed information of the vehicle 3 is input to the ECU 32.

Examples of the mobile terminal 4 include a mobile phone, a smartphone, and a tablet terminal which is carried by a user including an owner of the vehicle 3. The mobile terminal 4 includes a communication device 41, a processor 42, a GPS module 43, an acceleration sensor 44, and a touch panel display (hereinafter simply referred to as a "display") 45.

The communication device 41 is a device that bidirectionally communicates with the central server 5 via a predetermined communication network NW2 under the control of the processor 42 (specifically, a communication processing unit 421 which will be described later). The communication device 41 is a mobile communication module corresponding to a communication standard such as long term evolution (LTE), 4G (4th Generation), or 5G (5th Generation).

The processor 42 performs various control processes in the mobile terminal 4. The processor 42 is mainly constituted, for example, by a computer including a CPU, a RAM, a ROM, an auxiliary storage device, and an I/O. The processor 42 includes a communication processing unit 421, a sensor information acquiring unit 422, a moving means determining unit 423, a terminal movement information transmitting unit 424 as functional units which are embodied, for example, by causing the CPU to execute one or more programs stored in the ROM or the auxiliary storage device.

The communication processing unit 421 controls the communication device 41 such that it transmits and receives various signals to and from the central server 5.

The sensor information acquiring unit 422 acquires sensor information which is input from various sensors such as the GPS module 43 and the acceleration sensor 44 from a buffer in the RAM. Specifically, the sensor information acquiring unit 422 acquires position information of the mobile terminal 4 which is input from the GPS module 43. The sensor information acquiring unit 422 acquires information on acceleration (acceleration information) of the mobile terminal 4 which is input from the acceleration sensor 44.

The moving means determining unit 423 determines whether a user carrying the mobile terminal 4 is moving in a vehicle as moving means or by other moving means (on foot, on a bicycle, on a train, or the like) using an arbitrary method. For example, the moving means determining unit 423 may perform the determination, for example, by employing a discriminator that has been subjected to machine learning in advance to distinguish between a case in which the user is moving in a vehicle as moving means and a case in which the user is moving by other moving means based on the acceleration information which is input from the acceleration sensor 44. For example, the moving means determining unit 423 may determine whether the user is moving in a vehicle as moving means or by moving means other than a vehicle based on the position information of the mobile terminal 4 which is input from the GPS module 43 in addition or instead of the acceleration information which is input from the acceleration sensor 44.

The terminal movement information transmitting unit 424 generates information on movement of the mobile terminal 4 (terminal movement information), that is, movement of a user carrying the mobile terminal 4, and transmits the generated terminal movement information to the central server 5 via the communication processing unit 421. The terminal movement information can include the position information of the mobile terminal 4, time information corresponding to the position information, and the determination result from the moving means determining unit 423 (for example, whether there is a vehicle movement tag indicating that a vehicle is moving).

Similarly to the probe information which is transmitted from the vehicle 3 to the central server 5, the terminal movement information which is transmitted from the mobile terminal 4 to the central server 5 may not include time information corresponding to the position information. In this case, the central server 5 can use a time at which the terminal movement information has been transmitted from the mobile terminal 4, a time at which the terminal movement information has been received by the central server 5, an estimated time corresponding to the position information of the mobile terminal 4 which is calculated from the times, or the like as the time information corresponding to the terminal movement information similarly to the probe information. Then, the central server 5 can add the time information to the terminal movement information as time information corresponding to the terminal movement information received from the mobile terminal 4.

A digital signage device 7 (an example of a digital signage) is installed near a predetermined road and displays advertisement information (an advertisement image) which is delivered from the central server 5 via a predetermined communication network NW3 on its own display unit, for example, a liquid crystal display. Accordingly, a vehicle 3 traveling on the road, a pedestrian walking on the road, and the like are able to see the advertisement information displayed on the digital signage device 7.

The central server 5 collects and stores probe information from a plurality of vehicles 3. The central server 5 (an example of a digital signage control device) delivers advertisement information to the digital signage device 7 and displays the advertisement information thereon. The central server 5 includes a communication device 51 and a processor 52.

The function of the central server 5 may be embodied by a plurality of servers.

The communication device 51 is a device that bidirectionally communicates with a plurality of vehicles 3, a plurality of mobile terminals 4, and a plurality of digital signage devices 7 via predetermined communication networks NW1 to NW3 under the control of the processor 52 (specifically, a communication processing unit 5201).

The processor 52 (an example of a computer) performs various control processes in the central server 5. The processor 52 is mainly constituted, for example, by a computer including a CPU, a RAM, a ROM, an auxiliary storage device, and an I/O. The processor 52 includes a communication processing unit 5201, a vehicle movement information storage processing unit 5202, a terminal movement information storage processing unit 5203, a boarded vehicle extracting unit 5204, a used vehicle identifying unit 5205, a boarding ascertaining unit 5206, a passing vehicle identifying unit 5207, a traffic condition related information acquiring unit 5208, an occupant number information acquiring unit 5209, a signage information acquiring unit 5210, a first effect predicting unit 5211, an attribute information acquiring unit 5212, a second effect predicting unit 5213, and an advertisement delivering unit 5214 as functional units which are embodied, for example, by causing the CPU to execute one or more programs stored in the ROM or the auxiliary storage device. The processor 52 also includes, for example, a storage unit 5200 as a storage area which is defined in an auxiliary storage device of a server computer or an external storage device connected to the server computer. A map information DB 5200A, a vehicle information DB 5200B, a terminal information DB 5200C, a signage information DB 5200D, a probe information DB 5200E, a vehicle movement history DB 5200F, a terminal movement history DB 5200G, an advertisement DB 5200H, a used vehicle DB 5200I, and a passing vehicle DB 5200J are stored in the storage unit 5200.

The communication processing unit 5201 controls the communication device 51 such that it transmits and receives various signals (such as a control signal and an information signal) to and from a plurality of vehicles 3.

The vehicle movement information storage processing unit 5202 (an example of a vehicle movement history information collecting unit) performs a process of processing vehicle movement information which is sequentially received from the plurality of vehicles 3 by the communication processing unit 5201 and storing the processed information as movement histories of the vehicles 3 (vehicle movement histories) in the vehicle movement history DB 5200F. The vehicle movement history is, for example, a record where the vehicle 3 traveled. Specifically, the vehicle movement information storage processing unit 5202 may generate information on a movement history (trip information) for every period from starting to stopping of each vehicle 3, that is, for each trip, based on time-series data of the vehicle movement information of the plurality of vehicles 3 which is stored in the probe information DB 5200E. In other words, the vehicle movement information storage processing unit 5202 generates trip information from a departure point to a destination for each trip of the vehicle 3. Specifically, the vehicle movement information storage processing unit 5202 determines starting of the vehicle 3 based on the ACC-ON information included in the vehicle movement information, and defines the position information of the vehicle 3 included in the vehicle movement information including the ACC-ON information as a start point (a departure point) of this trip of the vehicle 3. The vehicle movement information storage processing unit 5202 defines the position information of the vehicle 3 which is included in the latest vehicle movement information including the ACC-OFF information in the vehicle movement information after the vehicle movement information was transmitted in a time series as an end point (a destination) of this trip of the vehicle 3. Then, the vehicle movement information storage processing unit 5202 combines the two pieces of vehicle movement information associated with the start point and the end point of one trip of the vehicle 3 and a plurality of pieces of vehicle movement information (a vehicle movement information group) between the two pieces of vehicle movement information in a time series and generates trip information. The vehicle movement information storage processing unit 5202 correlates the generated trip information of each vehicle 3 with identification information of the corresponding vehicle 3, for example, a vehicle index number (VIN) or a predetermined vehicle ID and stores the correlated data as a movement history of the vehicle 3 in the vehicle movement history DB 5200F.

The process which is performed by the vehicle movement information storage processing unit 5202 may be performed in real time to correspond to the probe information which is sequentially received from a plurality of vehicles 3 by the communication processing unit 5201, or may be periodically performed on non-processed probe information which has been collected to a certain extent in the probe information DB 5200E. The identification information of each of the plurality of vehicles 3 is registered in the vehicle information DB 5200B in advance.

The terminal movement information storage processing unit 5203 (an example of a terminal movement history information collecting unit) performs a process of storing terminal movement information which is sequentially received from a plurality of mobile terminals 4 by the communication processing unit 5201 as movement histories of the mobile terminals 4 (terminal movement histories) in the terminal movement history DB 5200G. Here, the terminal movement history is, for example, a record where the mobile terminal 4 traveled.

The process which is performed by the terminal movement information storage processing unit 5203 may be performed in real time to correspond to the terminal movement information which is sequentially received from a plurality of terminals 4 by the communication processing unit 5201, or may be periodically performed on non-processed terminal movement information which has been collected to a certain extent in a buffer of the RAM or the like.

The boarded vehicle extracting unit 5204 extracts a vehicle 3 which has been boarded by a user of one of a plurality of mobile terminals 4 based on the vehicle movement histories of a plurality of vehicles 3 and the terminal movement histories of a plurality of mobile terminals 4 which are stored in the vehicle movement history DB 5200F and the terminal movement history DB 5200G. In other words, the boarded vehicle extracting unit 5204 extracts a vehicle 3 which has been boarded by a user of one of the plurality of mobile terminals 4 among the plurality of vehicles 3.

For example, the boarded vehicle extracting unit 5204 may determine whether the two following conditions are satisfied based on the terminal movement histories of the mobile terminals 4 in the terminal movement history DB 5200G and the vehicle movement histories of the vehicles 3 in the vehicle movement history DB 5200F, that is, the trip information group.

Specifically, first, the boarded vehicle extracting unit 5204 determines whether a staying record condition indicating that there is a staying record of a mobile terminal 4 at a departure point and a destination of a vehicle 3 has been satisfied. More specifically, the boarded vehicle extracting unit 5204 determines whether the terminal movement history of the mobile terminal 4 indicates that the mobile terminal 4 has stayed in the vicinity of the departure point when the vehicle 3 has started, that is, within a predetermined time (for example, 10 minutes) before the ACC switch has been turned on, in the trip information of the vehicle 3. The boarded vehicle extracting unit 5204 also determines whether the terminal movement history of the mobile terminal 4 indicates that the mobile terminal 4 has stayed in the vicinity of the destination when the vehicle 3 has stopped, that is, within a predetermined time (for example, 10 minutes) after the ACC switch has been turned off, in the trip information of the vehicle 3. Accordingly, the boarded vehicle extracting unit 5204 can determine that the mobile terminal 4 has stayed in the vicinity of each of the departure point and the destination of the vehicle 3 in time periods in which the vehicle 3 has parked at the departure point and the destination.

Second, the boarded vehicle extracting unit 5204 determines whether a synchronous movement condition indicating that the mobile terminal 4 was present at the same positions on a moving route from the departure point to the destination at the same time as the vehicle 3 has been satisfied. More specifically, the boarded vehicle extracting unit 5204 compares a data group of vehicle movement information (time information and position information) between the departure point and the destination included in the trip information of the vehicle 3 with a data group of terminal movement information (time information and position information) included in the terminal movement history of the mobile terminal 4 in the same time period as this data group. Then, the boarded vehicle extracting unit 5204 determines that the synchronous movement condition has been satisfied when the vehicle movement information of the vehicle 3 and the terminal movement information of the mobile terminal 4 match each other at a plurality of points such that both can be determined to have been present at the same positions at the same times.

That is, the boarded vehicle extracting unit 5204 can extract a vehicle 3 which has been boarded by a user of the mobile terminal 4 by searching the terminal movement histories of a plurality of mobile terminals 4 for the trip information of the vehicle 3 in which both the staying record condition and the synchronous movement condition are satisfied.

The boarded vehicle extracting unit 5204 may extract a vehicle 3 which has been boarded by a user of the mobile terminal 4 using only the synchronous movement condition without using the staying record condition. The boarded vehicle extracting unit 5204 may perform the above-mentioned process in real time at the same time as updating the vehicle movement history DB 5200F and the terminal movement history DB 5200G in the vehicle movement information storage processing unit 5202 and the terminal movement information storage processing unit 5203. The boarded vehicle extracting unit 5204 may periodically perform the above-mentioned process on non-processed vehicle movement histories and terminal movement histories which are collected to a certain extent.

The used vehicle identifying unit 5205 identifies a vehicle 3 which is used by a user of each of a plurality of mobile terminals 4. A vehicle 3 which is used by a user of a mobile terminal 4 includes a vehicle 3 which is used by a user as a driver and a vehicle 3 which is used by a user as a passenger of a driver. Specifically, the used vehicle identifying unit 5205 identifies a vehicle 3 which is used by a user of each of a plurality of mobile terminals 4 from the vehicles 3 which are boarded by the users of the plurality of mobile terminals 4, that is, which have been boarded, and which are extracted by the boarded vehicle extracting unit 5204. The used vehicle identifying unit 5205 correlates the mobile terminals 4 or the users of the plurality of mobile terminals 4, with the identified vehicle 3 which is used by the user of each of the plurality of mobile terminals 4 and stores the correlated data in the used vehicle DB 5200I. Hereinafter, it is assumed that mobile terminals 4 and vehicles 3 which are used by users of the mobile terminals 4 are correlated and stored in the used vehicle DB 5200I. At this time, the used vehicle identifying unit 5205 also stores a boarding frequency (the number of times of boarding) of the identified vehicle 3 which is used by the user of each of the plurality of mobile terminals 4 in the used vehicle DB 5200I. That is, the used vehicle identifying unit 5205 constructs the used vehicle DB 5200I in which a plurality of mobile terminals 4 and vehicles 3 which are used by users of the plurality of mobile terminals 4 are correlated using a boarding frequency (the number of times of boarding) indicating a relationship therebetween. For example, the used vehicle DB 5200I can be constructed as a graph type database in which each vehicle 3 and each mobile terminal 4 are set as nodes and the boarding frequency is set as relation information.

As described above, the boarded vehicle extracting unit 5204 performs a process of extracting a user which has boarded one of a plurality of vehicles 3 in real time in response to updating of the vehicle movement history DB 5200F and the terminal movement history DB 5200G or periodically. Accordingly, the used vehicle identifying unit 5205 updates the used vehicle DB 5200I depending on the result of the extraction process which is sequentially performed by the boarded vehicle extracting unit 5204. Specifically, when a user of a mobile terminal 4 has boarded a vehicle 3 which has not been boarded and the boarded vehicle extracting unit 5204 has newly extracted the vehicle 3, the used vehicle identifying unit 5205 stores the user of the mobile terminal 4 and the vehicle 3 in the used vehicle DB 5200I in correlation with each other. When a user of a mobile terminal 4 has boarded a vehicle 3 which has been already boarded and the boarded vehicle extracting unit 5204 has newly extracted the vehicle 3, the used vehicle identifying unit 5205 updates the boarding frequency which is the relation information stored in the used vehicle DB 5200I.

The used vehicle DB 5200I may be constructed as a general relational database instead of a graph type database.

The boarding ascertaining unit 5206 (an example of an occupant identifying unit) ascertains whether a user of a mobile terminal 4 actually boards a vehicle 3 which is used by the user of the mobile terminal 4 based on a conditional relationship between a plurality of mobile terminals 4 and a plurality of vehicles 3 which is stored in the used vehicle DB 5200I. In other words, the boarding ascertaining unit 5206 identifies users who board the vehicles 3. For example, the boarding ascertaining unit 5206 compares current terminal movement information of the plurality of mobile terminals 4 with current vehicle movement information of the vehicle 3 correlated with the corresponding mobile terminals 4 in the used vehicle DB 5200I in real time. Accordingly, the boarding ascertaining unit 5206 has only to monitor only the vehicle movement histories of the vehicles 3 which are identified in advance to be used by the users of the corresponding mobile terminals 4 in the used vehicle DB 5200I and can ascertain whether the users of the mobile terminals 4 board the corresponding vehicles 3 in a realistic processing time.

The boarding ascertaining unit 5206 registers identification information of the mobile terminal 4 of the user who is ascertained to board the corresponding vehicle 3 and a boarding tag indicating the boarding to the corresponding probe information (vehicle movement information) and registers the resultant data in the probe information DB 5200E. Accordingly, the vehicle movement information storage processing unit 5202 can add the identification information of the mobile terminal 4 of the user who boards the vehicle 3 in each corresponding trip to the trip information.

The identification information of the mobile terminals 4 is stored in the terminal information DB 5200C in which a variety of information of the mobile terminals 4 is registered in advance.

The passing vehicle identifying unit 5207 ascertains vehicles 3 which pass by the vicinity of each of a plurality of digital signage devices 7. That is, the passing vehicle identifying unit 5207 ascertains the vehicles 3 which have passed along nearby roads on which a display section of each digital signage device 7 can be seen from an arbitrary vehicle located on (hereinafter simply referred to as nearby roads). Specifically, the passing vehicle identifying unit 5207 acquires information on an installation position of each digital signage device 7 (for example, position information or a link ID of a nearby road) based on the signage information DB 5200D. The passing vehicle identifying unit 5207 ascertains the vehicles 3 having passed by each digital signage device 7 based on the vehicle movement histories of the vehicles 3 in the vehicle movement history DB 5200F.

The passing vehicle identifying unit 5207 ascertains users who board each identified vehicle 3. Specifically, the passing vehicle identifying unit 5207 extracts corresponding trip information from the vehicle movement history DB 5200F based on identification information of the vehicles 3 passing through each digital signage device 7 and passing time information thereof. The passing vehicle identifying unit 5207 ascertains the boarding users by extracting the identification information of the mobile terminals 4 of the boarding users which is included in the extracted trip information.

The passing vehicle identifying unit 5207 stores the identification information of the identified vehicles 3, the passing time information, and the identification information of the mobile terminals 4 of the boarding users in the passing vehicle DB 5200J in correlation with the identification information of the corresponding digital signage device 7 (for example, a signage ID).

The traffic condition related information acquiring unit 5208 acquires information related to traffic conditions near each digital signage device 7 (traffic condition related information). In this embodiment, the traffic condition related information acquiring unit 5208 acquires traffic volume information of a road near each digital signage device 7 and vehicle speed information of vehicles passing along the nearby road.

For example, the traffic condition related information acquiring unit 5208 acquires information on the number of vehicles 3 (an example of probe vehicles) passing along the road near each digital signage device 7 (passing vehicle number information) in a predetermined period as the traffic volume information. Specifically, the traffic condition related information acquiring unit 5208 calculates the number of passing vehicles by counting the vehicles 3 passing in a predetermined period based on the identification information of the vehicles 3 passing through each digital signage device 7 and passing time information which are stored in the passing vehicle DB 5200J.

For example, the traffic condition related information acquiring unit 5208 acquires the vehicle speed information of the passing vehicles 3 from the probe information DB 5200E based on the identification information of the vehicles 3 passing through each digital signage device 7 and passing time information which are stored in the passing vehicle DB 5200J.

For example, the traffic condition related information acquiring unit 5208 may access an external road traffic information server via the communication processing unit 5201 or the like and acquire the traffic volume information of the road near each digital signage device 7 from the road traffic information server. For example, the traffic condition related information acquiring unit 5208 may access an external road traffic information server or the like via the communication processing unit 5201 and acquire the vehicle speed information of the vehicles passing along the nearby road, which is detected by a road-side device, from the road traffic information server or the like. For example, a vehicle speed detecting unit that detects vehicle speeds of vehicles passing along the nearby road may be provided in each digital signage device 7 and the traffic condition related information acquiring unit 5208 may acquire the vehicle speed information which is received from the digital signage device 7 by the communication processing unit 5201.

The occupant number information acquiring unit 5209 acquires information on the number of occupants of the vehicles passing along the road near each digital signage device 7. For example, the occupant number information acquiring unit 5209 acquires the number of occupants of the vehicles 3 passing along the road near each digital signage device 7 which is stored in the passing vehicle DB 5200J. Specifically, the occupant number information acquiring unit 5209 acquires the number of occupants of the vehicle 3 based on the time information of the vehicles 3 passing through each digital signage device 7 and the identification information of the mobile terminals 4 of the occupants of the vehicles 3 which are stored in the passing vehicle DB 5200J.

For example, the occupant number information acquiring unit 5209 may access an external server associated with road traffic examination or the like via the communication processing unit 5201 and acquire occupant number information on the number of occupants of the vehicles passing along the road near each digital signage device 7 from the server. For example, a camera that images vehicles passing along the nearby road may be provided in each digital signage device 7 and the occupant number information acquiring unit 5209 may acquire the occupant number information based on a captured image which is received from the digital signage device 7 via the communication processing unit 5201.

The signage information acquiring unit 5210 (an example of a conspicuousness information acquiring unit) acquires information on conspicuousness (conspicuousness information) when each digital signage device 7 is seen from a vehicle on the nearby road. The conspicuousness indicates, for example, how clear the occupant of the vehicle can see the digital signage device 7. For example, the signage information acquiring unit 5210 acquires information on what direction with respect to the traveling direction of the vehicle located on the nearby road a display surface of each digital signage device 7 faces. Specifically, the signage information acquiring unit 5210 acquires information on installation conditions (installation condition information) of each digital signage device 7 with respect to the nearby road from the signage information DB 5200D.

The signage information acquiring unit 5210 may acquire information on height of the display surface of the digital signage device 7 from a road surface of the nearby road, information on size of the display surface of each digital signage device 7, or the like as the conspicuousness information.

The first effect predicting unit 5211 predicts an effect index (an impression index) corresponding to an impression of advertisement information displayed on each digital signage device 7 over a predetermined display period. The impression is one of indexes which indicate how many times the general public see the advertisement. Here, predicting the effect index corresponding to the impression by the first effect predicting unit 5211 may be the calculating the effect index value indicating the impression by the first effect predicting unit 5211.

For example, the first effect predicting unit 5211 calculates an impression index of advertisement information in a predetermined period in which the advertisement information is displayed on the digital signage device 7. An impression of advertisement information dedicated for vehicles which is displayed on the digital signage device 7 basically depends on the number of passing vehicles. When the advertisement information dedicated for vehicles displayed on the digital signage device 7 is seen from the vehicles by occupants, it is more difficult to recognize details thereof as the vehicle speed becomes higher and thus the vehicle speed of a passing vehicle affects an actual impression. Since there is a likelihood that an occupant as well as a driver will be in a vehicle passing along a road near each digital signage device 7, the number of occupants of the vehicle passing along the road near the digital signage device 7 affects an actual impression. Conspicuousness of the digital signage device 7 when seen from an occupant passing along the nearby road varies depending on a viewing direction (a display direction) of the display surface of the digital signage device 7 with respect to the traveling direction when seen from the vehicle traveling on the nearby road, and the viewing direction affects recognition of the advertisement information by an occupant. Accordingly, the first effect predicting unit 5211 calculates the impression index using Equation (1).

Impression index=number of passing vehicles×vehicle speed coefficient×average occupant number×display direction coefficient (1)

The speed vehicle coefficient is a coefficient which is determined depending on an average value of vehicle speed information (average vehicle speed) of vehicles passing along the road near each digital signage device 7 in a predetermined period which is acquired by the traffic condition related information acquiring unit 5208. For example, the vehicle speed coefficient has a value of 0 to 1 and is set such that the value decreases as the average vehicle speed increases. The change of the vehicle speed coefficient with an increase in the average vehicle speed may be determined by statistical data of human kinetic eyesight, experiment for recognition of information from traveling vehicles which has been actually carried out, or the like. The display direction coefficient is a coefficient which is determined depending on the viewing direction of the display surface of the digital signage device 7 with respect to the traveling direction when seen from an occupant of a vehicle on the nearby road. For example, the display direction coefficient has a value of 0 to 1 and is set such that the occupant has more difficulty in seeing the display and that the value decreases as the viewing direction departs more laterally from the traveling direction to right or left with respect to a case in which the digital signage device 7 is seen on the substantially front side (the traveling direction) from a vehicle on the nearby road. Specifically, the display direction coefficient may be set to 1.0 when the digital signage device 7 is seen on the substantially front side (the traveling direction) from a vehicle on the nearby road, be set to 0.75 when the viewing direction is inclined laterally from the traveling direction, and be set to 0.5 when the viewing direction is substantially perpendicular to the traveling direction. Calculation expressions or map information indicating correspondence between the average vehicle speed and the vehicle speed coefficient and correspondence between a direction in which the display surface of the digital signage device 7 is seen with respect to the traveling direction and the display direction coefficient when the digital signage device 7 is seen by an occupant in a vehicle 3 on the nearby road is registered, for example, in the storage unit 5200 in advance.

In this embodiment, the impression index is calculated based on the traffic volume information, the vehicle speed information, the occupant number information, and the conspicuousness information, but the impression index may be simply calculated based on some thereof. For example, the impression index may be simply calculated using some of the vehicle speed information, the occupant number information, and the conspicuousness information with the traffic volume information as a base.

The first effect predicting unit 5211 predicts an impression index over a predetermined display period (the entire display period) from a start of display of the corresponding advertisement information to an end of display from the calculated impression index in the predetermined period. For example, the first effect predicting unit 5211 may calculate a daily impression index from the calculated impression index in the predetermined period and predict the impression index over the entire display period by adding an impression index depending on remaining days. For example, the first effect predicting unit 5211 may calculate a daily impression index by weekdays and holidays and predict the impression index over the entire display period by adding an impression index by weekdays and holidays of the remaining days.

The attribute information acquiring unit 5212 acquires predetermined attribute information of occupants of vehicles 3 passing along a road near each digital signage device 7 from the terminal information DB 5200C (an example of an attribute information storing unit). For example, attributes of target users (for example, age and sex) are set for advertisement information displayed on a digital signage device 7 in advance, and the attribute information acquiring unit 5212 acquires attribute information for determining whether attributes correspond to the target attributes. Specifically, the attribute information acquiring unit 5212 acquires predetermined attribute information of the users from the terminal information DB 5200C based on the identification information of the mobile terminals 4 of the occupants of the vehicles 3 passing along the road near the digital signage device 7 which is stored in the passing vehicle DB 5200J.

In addition to advertisement data (for example, an advertisement image) corresponding to details of input advertisement, information (inducement destination information) on an inducement destination (an actual store for selling target goods of the advertisement or the like) to which it is intended to induce audience by the advertisement, attribute information (audience attribute target information) target audience which is a target of the advertisement, information (location target information) on a location which is a target of the advertisement (for example, a point of interest (POI) at which most target audience gathers, an area close to an inducement destination, and a road link with a high likelihood that audience to the inducement destination will pass along the road link), and the like are stored in the advertisement DB 5200H in correlation with the advertisement data. The attribute information acquiring unit 5212 can ascertain types of attribute information to be acquired based on the user attribute target information of the corresponding advertisement information stored in the advertisement DB 5200H.

The second effect predicting unit 5213 predicts an effect index (an audience attribute index) of advertisement information displayed on the digital signage device 7 which is associated with appropriateness of audience attributes over a predetermined display period. That is, the second effect predicting unit 5213 predicts what proportion of occupants of vehicles which are suitable for audience attribute target information passes along the nearby road in the display period. Here, predicting the audience attribute index by the second effect predicting unit 5213 may be calculating the effect index value indicating the appropriateness of audience attributes by the second effect predicting unit 5213.

For example, the second effect predicting unit 5213 calculates an audience attribute index of advertisement information in a predetermined period in which the advertisement information is displayed on the digital signage device 7. Specifically, the second effect predicting unit 5213 calculates a proportion of users of which the attribute information acquired by the attribute information acquiring unit 5212 is suitable for the audience attribute target information to users boarding the vehicles 3 passing along the road near the digital signage device 7 in a predetermined period.

The second effect predicting unit 5213 predicts an audience attribute index over a predetermined display period (the entire display period) from a start of display of the corresponding advertisement information to an end of display from the calculated audience attribute index in the predetermined period. For example, the second effect predicting unit 5213 may predict that a tendency of the audience attribute index in the predetermined period is maintained and set the calculated audience attribute index to the predicted value. The second effect predicting unit 5213 may calculate an audience attribute index by weekdays and holidays as the predetermined period and then predict the audience attribute index over the entire display period depending on proportions of weekdays and holidays of the remaining days.

The advertisement delivering unit 5214 (an example of a display control unit) transmits advertisement data to a digital signage device 7 which is an advertisement delivery target via the communication processing unit 5201. Accordingly, the advertisement delivering unit 5214 can display advertisement information (an advertisement image) corresponding to the advertisement data on the display unit of the digital signage device 7.

When it is determined that an expected advertising effect is not obtained from a certain digital signage device 7 based on the traffic condition related information acquired by the traffic condition related information acquiring unit 5208, the advertisement delivering unit 5214 changes a destination of the digital signage device 7 on which the advertisement information is displayed. Specifically, when advertising effects of advertisement information displayed on each digital signage device 7 predicted by the first effect predicting unit 5211 and the second effect predicting unit 5213 do not reach an expected standard, the advertisement delivering unit 5214 performs transfer of advertisement information to another digital signage device 7 in which an advertising effect is improved. Accordingly, it is possible to restrain deterioration in advertising effects associated with appropriateness of an impression and audience attributes and to improve appropriate effects of the advertisement information displayed on a digital signage device 7. Details thereof will be described later.

[Details of Operation of Advertisement Delivery System]

A specific operation of the advertisement delivery system 1 according to this embodiment will be described below with reference to FIGS. 5 to 7.

Figure 5:
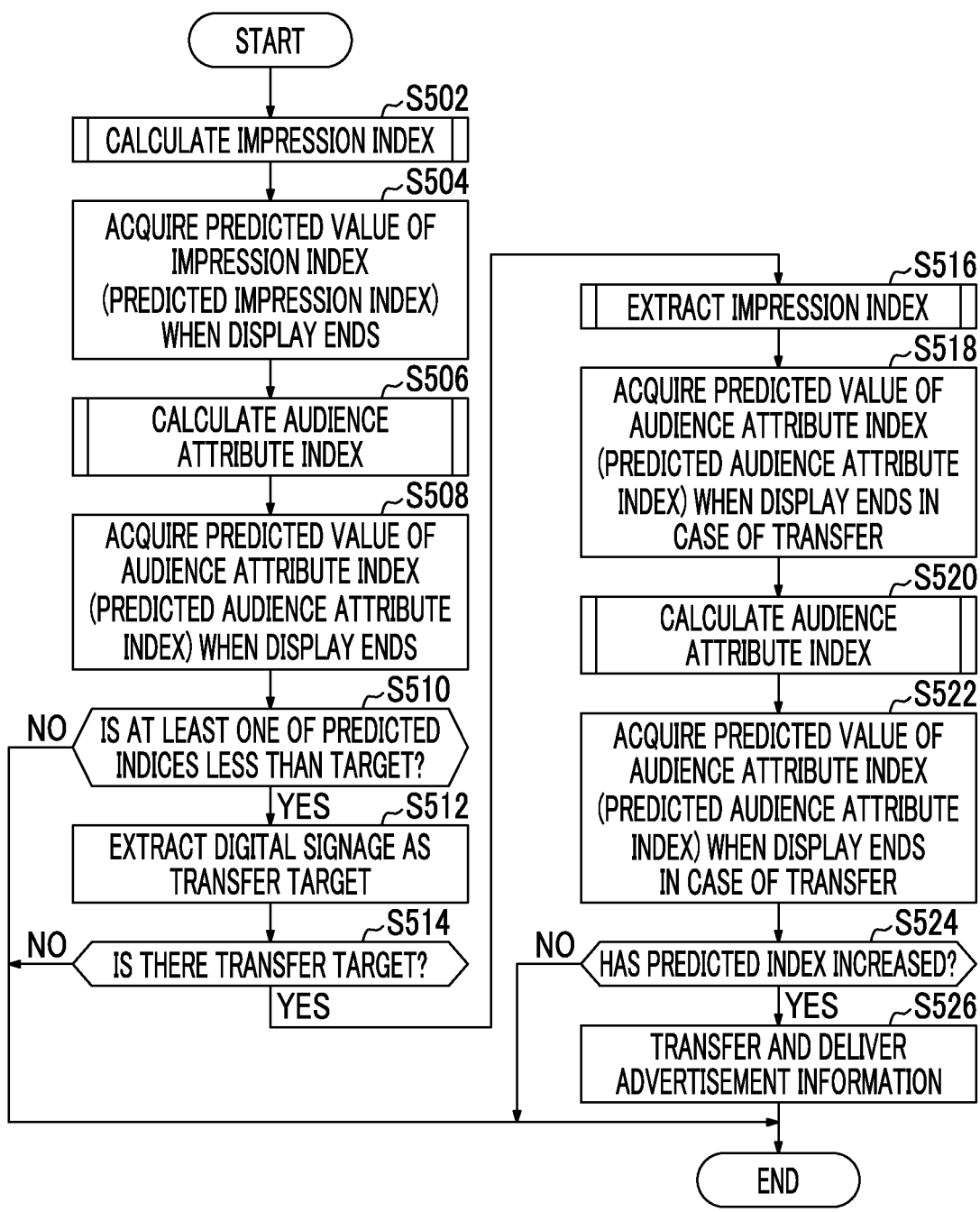
FIG. 5 is a flowchart schematically illustrating an example of a processing routine which is performed by the central server according to the first embodiment.

FIG. 5 is a flowchart schematically illustrating an example of a processing routine which is performed by the processor 52 of the central server 5 according to this embodiment. FIG. 6 is a sub-flowchart schematically illustrating an example of an impression index calculating process which is performed by the processor 52 of the central server 5 according to this embodiment. FIG. 7 is a sub-flowchart schematically illustrating an example of an audience attribute index calculating process which is performed by the processor 52 of the central server 5 according to this embodiment.

The processing routine described in the flowchart of FIG. 5 may be performed on digital signage devices 7 for every predetermined period, for example, everyday. Hereinafter, the same is true of the flowchart of FIG. 11.

Referring to FIG. 5, in Step S502, the processor 52 calculates an impression index in a display period (from a start of display to a current time) of advertisement information which is currently displayed on a target digital signage device 7. The impression index calculating process will be described below with reference to FIG. 6.

In the process of Step S502, a "predetermined period in FIG. 6 which will be described below corresponds to a display period of advertisement information which is currently displayed on a target digital signage device 7.

In Step S602, the traffic condition related information acquiring unit 5208 calculates the number of vehicles 3 passing along a road near the target digital signage device 7 in a predetermined period based on the passing vehicle DB 5200J.

In Step S604, the traffic condition related information acquiring unit 5208 acquires vehicle speed information of the vehicles 3 passing along the road near the digital signage device 7 in the predetermined period from the probe information DB 5200E.

In Step S606, the first effect predicting unit 5211 calculates an average vehicle speed of the vehicles 3 passing along the road near the digital signage device 7 in the predetermined period based on the vehicle speed information acquired by the traffic condition related information acquiring unit 5208.

In Step S608, the occupant number information acquiring unit 5209 acquires the number of occupants of the vehicles 3 who have boarded the vehicles 3 passing along the road near the digital signage device 7 in the predetermined period based on the passing vehicle DB 5200J.

In Step S610, the first effect predicting unit 5211 calculates the average number of occupants of the vehicles 3 passing along the road near the digital signage device 7 in the predetermined period based on the occupant number information acquired by the occupant number information acquiring unit 5209.

In Step S612, the signage information acquiring unit 5210 acquires display direction information of the digital signage device 7 from the signage information DB 5200D.

In Step S614, an impression index of the advertisement information of the digital signage device 7 in the predetermined period is calculated by multiplying the number of passing vehicles, the vehicle speed coefficient corresponding to the average vehicle speed, the average number of occupants, and the display direction coefficient corresponding to the display direction information.

Referring back to FIG. 5, in Step S504, a predicted value of an impression index (a predicted impression index) of the advertisement information of the digital signage device 7 in the entire display period when display ends is calculated.

In Step S506, the processor 52 calculates an audience attribute index in a display period (from a start of display to the current time) of advertisement information which is currently displayed on the target digital signage device 7. The audience attribute index calculating process will be described below with reference to FIG. 7.

In the process of Step S506, a "predetermined period" in FIG. 7 which will be described below corresponds to a display period of advertisement information which is currently displayed on a target digital signage device 7.

In Step S702, the attribute information acquiring unit 5212 acquires predetermined attribute information of occupants of the vehicles 3 passing along the target digital signage device 7 in a predetermined period from the terminal information DB 5200C.

In Step S704, the second effect predicting unit 5213 calculates an audience attribute index of the advertisement information of the digital signage device 7 in the predetermined period based on the attribute information acquired by the attribute information acquiring unit 5212.

Referring back to FIG. 5, in Step S508, the second effect predicting unit 5213 calculates a predicted value of an audience attribute index (a predicted audience attribute index) of the advertisement information of the digital signage device 7 in the entire display period when display ends.

In Step S510, the advertisement delivering unit 5214 determines whether both the predicted impression index and the predicted audience attribute index reach predetermined target standards. The advertisement delivering unit 5214 performs Step S512 when one thereof does not reach the target standard, and ends this routine when both reach the target standards.

In Step S512, the advertisement delivering unit 5214 extracts a digital signage device 7 as a transfer destination to which the advertisement information displayed on the digital signage device 7 can be transferred among a plurality of digital signage devices 7. For example, the advertisement delivering unit 5214 extracts digital signage devices 7 which are installed in areas suitable for location target information of the advertisement information based on the signage information DB 5200D. When a digital signage device 7 on which advertisement information is not displayed is present in the extracted digital signage devices 7, the advertisement delivering unit 5214 may determine that the digital signage device 7 is a transfer destination. The advertisement delivering unit 5214 may determine that a digital signage device 7 on which advertisement information of which target standards of an impression index and an audience attribute index are not set, that is, effect-unguaranteed advertisement information, is displayed is a transfer destination among the extracted digital signage devices 7. The advertisement delivering unit 5214 may determine that a digital signage device 7 on which advertisement information in which a prescribed priority is relatively low is displayed as a transfer destination among the extracted digital signage devices 7. The same is true of a second embodiment (Step S1108 in FIG. 11 which will be described later).

In Step S514, the advertisement delivering unit 5214 determines whether there is a digital signage device 7 as a transfer destination. The advertisement delivering unit 5214 performs Step S516 when there is a digital signage device 7 as a transfer destination, and ends this routine when there is no digital signage device 7 as a transfer destination.

When there are a plurality of digital signage devices 7 as a transfer destination, the processes of Steps S516 to S522 are performed in parallel on the digital signage devices 7 as a transfer destination.

Figure 6:
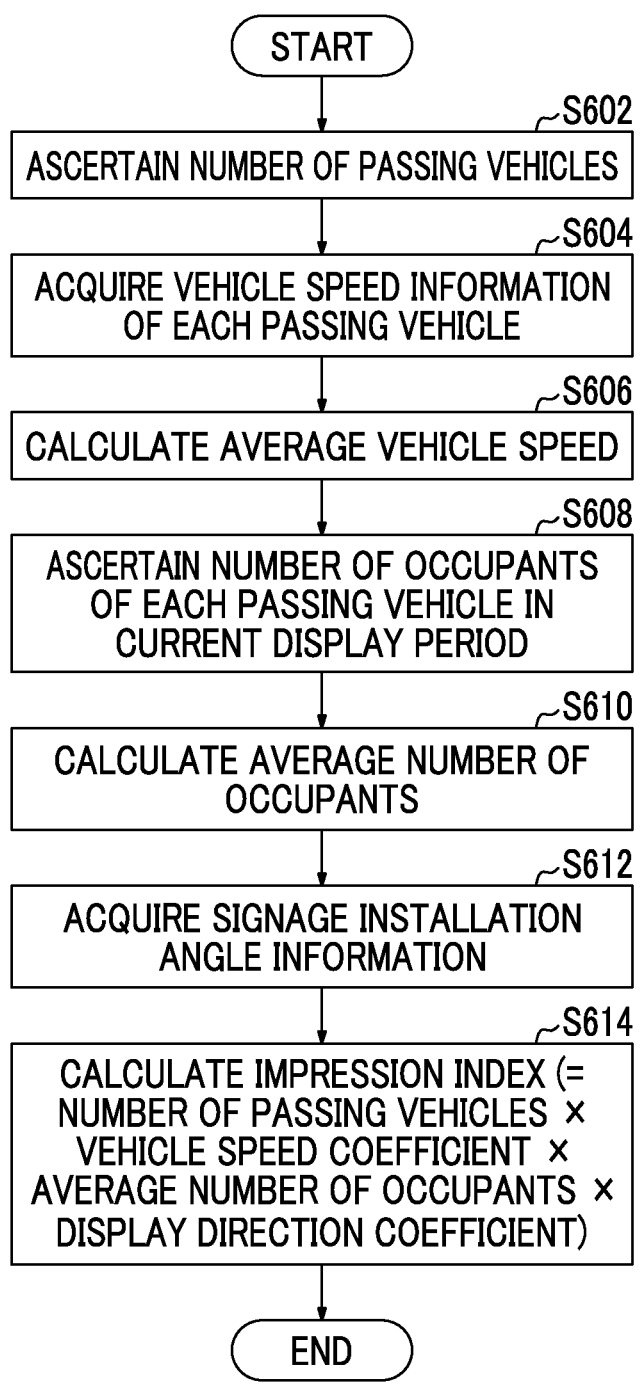
FIG. 6 is a sub-flowchart schematically illustrating an example of an impression index calculating process which is performed by the central server according to the first embodiment.

In Step S516, the processor 52 calculates an impression index in one or more specific periods (for example, for a past week) of advertisement information of the digital signage device 7 as a transfer destination through the process illustrated in FIG. 6.

In the process of Step S516, the above-mentioned "predetermined period" in FIG. 6 corresponds to the specific period.

In Step S518, the first effect predicting unit 5211 calculates a predicted impression index in the entire display period when display ends in a case in which advertisement information has been transferred to the digital signage device 7 as a transfer destination. Specifically, the predicted impression index may be calculated by adding an impression index corresponding to the remaining display period which is calculated based on the impression index calculated in Step S516 to the impression index of the advertisement information in the display period up to now which is calculated in Step S502. For example, the impression index corresponding to the remaining display period may be calculated as a value (a proportional distributed value) obtained by proportionally distributing the impression index in the specific period calculated in Step S516 to the remaining display period. For example, the impression index corresponding to the remaining display period may be calculated depending on days of weekdays and holidays of the remaining display period using an impression index of weekdays and an impression index of holidays which are calculated on the premise that the impression index is calculated by a specific period of weekdays and a specific period of holidays in Step S516. For example, the impression index corresponding to the remaining display period may be calculated in consideration of change of the impression index by specific periods on the premise that the impression index is calculated by a plurality of specific periods (for example, everyday) in Step S516.

Figure 7:
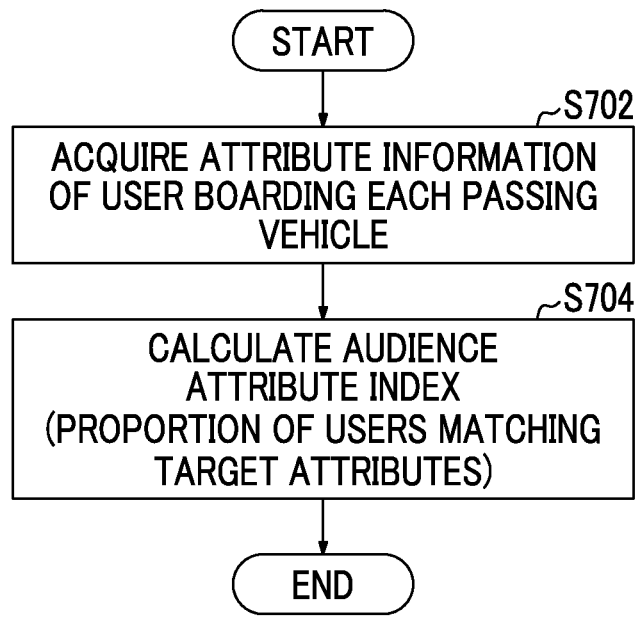
FIG. 7 is a sub-flowchart schematically illustrating an example of an audience attribute index calculating process which is performed by the central server according to the first embodiment.

In Step S520, the processor 52 calculates an audience attribute index in the specific period of the advertisement information of the digital signage device 7 as a transfer destination through the process illustrated in FIG. 7.

In the process of Step S520, the above-mentioned "predetermined period" in FIG. 7 corresponds to the specific period.

In Step S522, the second effect predicting unit 5213 calculates a predicted audience attribute index in the entire display period when display ends in a case in which advertisement information has been transferred to the digital signage device 7 as a transfer destination. For example, by summing the audience attribute index in the display period up to now of the digital signage device 7 calculated in Step S506 and the audience attribute index in the specific period in the transfer destination calculated in Step S520 depending on the proportion of the number of occupants passing along the nearby road in the periods, the predicted audience attribute index may be calculated. For example, the audience attribute index may be calculated by weekdays and holidays as the specific period in Step S520 and the predicted audience attribute index may be calculated depending on the days of the weekdays and the holidays of the remaining display period.

In Step S524, the advertisement delivering unit 5214 determines whether there is a digital signage device 7 in which the predicted impression index and the predicted audience attribute index are improved due to the transfer among the digital signage devices 7 as a transfer destination. The advertisement delivering unit 5214 performs Step S526 when there is a digital signage device 7 in which the predicted impression index and the predicted audience attribute index are improved due to the transfer, and ends this routine when there is not such a digital signage device 7.

In Step S526, the advertisement delivering unit 5214 transfers and delivers the advertisement information to the digital signage device 7 in which the predicted impression index and the predicted audience attribute index are improved and then ends this routine. Here, when there are a plurality of digital signage devices 7 in which the predicted impression index and the predicted audience attribute index are improved, the advertisement delivering unit 5214 may transfer and deliver the advertisement information to the digital signage device 7 having a largest improvement in effect. In this case, the advertisement delivering unit 5214 may put a focus on one of the predicted impression index and the predicted audience attribute index and transfer the advertisement information to the digital signage device 7 having a largest improvement in the focused index.

When advertisement information is displayed on the digital signage device 7 as a transfer destination, the advertisement information may be transferred to the digital signage device 7 on which the advertisement information to be transferred has been displayed before the transfer. As for the advertisement information which has been displayed on the digital signage device 7 as the transfer destination, a digital signage device 7 as a new transfer destination may be selected through the processes of Steps S512 to S526.

[Operation]

The operation of the advertisement delivery system 1 according to this embodiment, specifically, the operation based on the processing routine of the central server 5 illustrated in FIG. 5, will be described below with reference to FIGS. 8A to 8D.

Figure 8A:
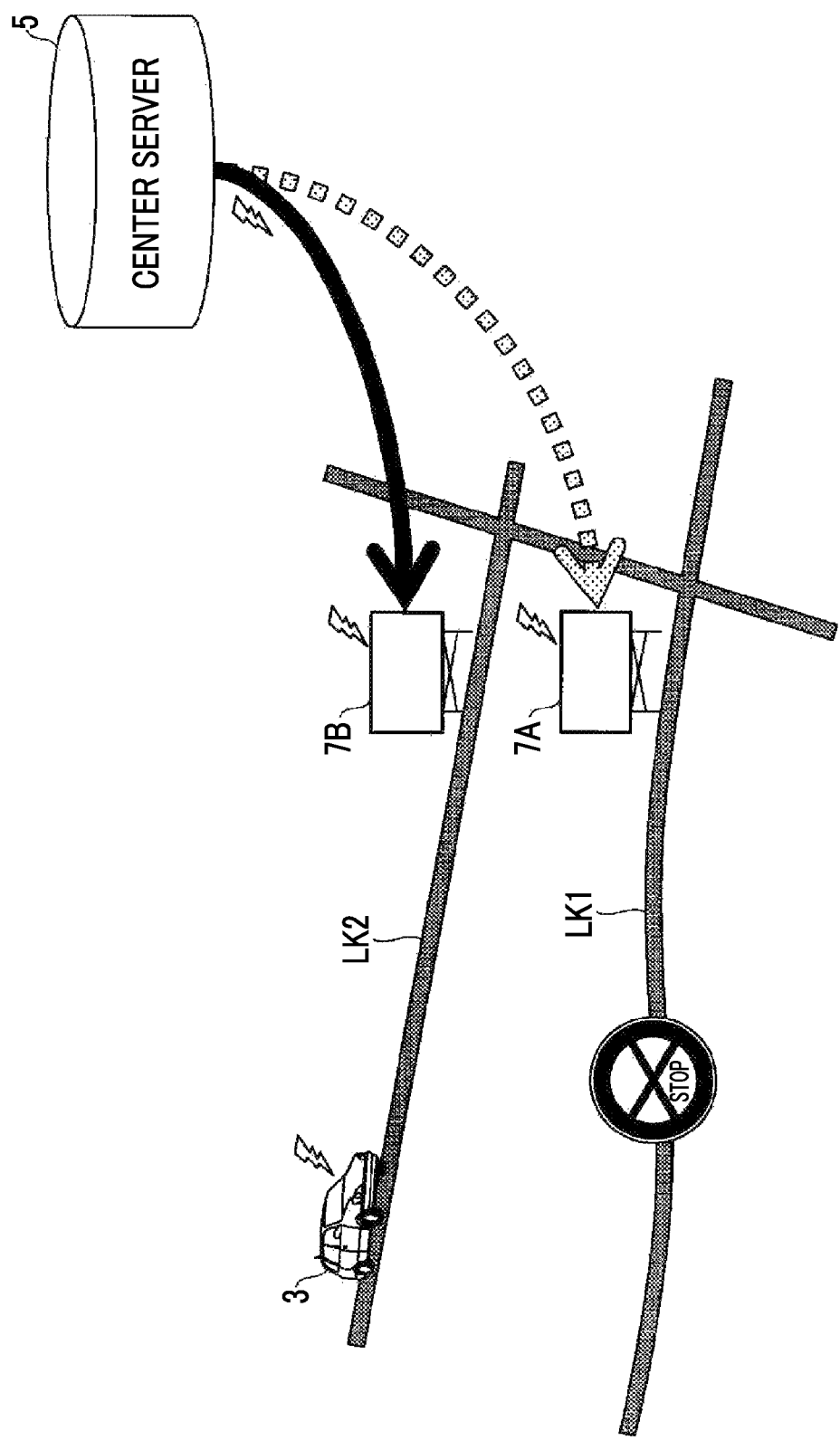
FIG. 8A is a diagram illustrating an operation of the advertisement delivery system.

FIGS. 8A to 8D are diagrams illustrating the operation of the advertisement delivery system 1 according to this embodiment. Specifically, FIG. 8A is a diagram schematically illustrating a situation in which advertisement information has been transferred from a digital signage device 7A to a digital signage device 7B among two digital signage devices 7A and 7B of the digital signage devices 7. FIG. 8B is a diagram illustrating targets of the impression index and the audience attribute index of the advertisement information displayed on the digital signage device 7A. FIG. 8C is a diagram illustrating a predicted impression index before the advertisement information displayed on the digital signage device 7A is transferred to the digital signage device 7B. FIG. 8D is a diagram illustrating results of the impression index and the audience attribute index in the entire display period when the display period expires after the advertisement information displayed on the digital signage device 7A has been transferred to the digital signage device 7B.

As illustrated in FIG. 8A, a curfew is imposed on a road link LK1 which is a road near a digital signage device 7 for some reasons. Accordingly, as illustrated in FIGS. 8B and 8C, the predicted impression index and the predicted audience attribute index do not reach target references of the impression index and the audience attribute index. Specifically, the target of the impression index is 500,000 impressions (see FIG. 8B), and the calculated predicted impression index is 250,000 impressions (see FIG. 8C). The audience attribute index is 30% which is a ratio of women in twenties and women in thirties to all users passing along the nearby road, and the predicted audience attribute index is 10% which is a proportion of women in twenties and women in thirties.

Therefore, as illustrated in FIG. 8A, the advertisement delivering unit 5214 transfers the advertisement information displayed on the digital signage device 7A to another digital signage device 7 as described above. In this example, the advertisement delivering unit 5214 transfers the advertisement information displayed on the digital signage device 7A to the digital signage device 7B adjacent to a road link LK2 which is substantially parallel to the road link LK1 under the curfew. When the road link LK1 is subjected to the curfew, there is a likelihood that vehicles passing along the road link LK1 will flow to the road link LK2 which is parallel thereto and an improvement in effect such as a high impression index is expected.

Accordingly, in this example, as illustrated in FIG. 8D, the final impression index of the advertisement information in the entire display period is 550,000 impressions which are higher than the predicted value and the target is achieved. The audience attribute index does not reach the target, but the proportion of women in twenties and women in thirties is 25% which is higher than the predicted value.

In this way, in this embodiment, the traffic condition related information acquiring unit 5208 acquires traffic condition related information related to traffic conditions near each of a plurality of digital signage devices 7. Then, the advertisement delivering unit 5214 changes the digital signage device 7 on which advertisement information is displayed among a plurality of digital signage devices 7 based on the traffic condition related information.

Accordingly, the central server 5 can ascertain, for example, a traffic volume of a road near each digital signage device 7 from the traffic condition related information and predict an effect index corresponding to an impression of the digital signage device 7. Accordingly, the central server 5 can transfer advertisement information displayed on the digital signage device 7 to another digital signage device 7 when a predicted value of the effect index is less than an expected standard, or the like. As a result, it is possible to restrain deterioration in advertising effect and to achieve an appropriate effect for an advertisement displayed on the digital signage device 7.

Specifically, the first effect predicting unit 5211 predicts an effect index (an impression index) corresponding to an impression of advertisement information displayed on each of a plurality of digital signage devices 7 over a predetermined display period based on the traffic condition related information. When an impression index of one piece of advertisement information which is displayed on one digital signage device 7 of a plurality of digital signage devices 7 and which is predicted by the first effect predicting unit 5211 is less than a predetermined first standard, the advertisement delivering unit 5214 changes a destination on which the one piece of advertisement information is displayed from the one digital signage device 7 to another digital signage device 7 in which the impression index of the one piece of advertisement information predicted by the first effect predicting unit 5211 is improved among the plurality of digital signage devices 7.

Accordingly, the central server 5 can predict the effect index of the impression of one piece of advertisement information displayed on one digital signage device 7 and transfer the advertisement information to another digital signage device 7 as a display destination when the predicted effect index is less than an expected standard. Accordingly, it is possible to restrain deterioration in advertising effect and to achieve an appropriate effect for an advertisement displayed on the digital signage device 7.

In this embodiment, the traffic condition related information acquiring unit 5208 acquires the traffic condition related information including the traffic volume information of a road near each of a plurality of digital signage devices 7 and the vehicle speed information of vehicles passing along the nearby road. Then, the first effect predicting unit 5211 predicts an impression index based on the traffic volume information and the vehicle speed information.

Accordingly, the central server 5 can ascertain the number of vehicles which are boarded by persons having a likelihood of viewing the digital signage device 7 based on the traffic volume information. In general, as a vehicle speed of a vehicle passing a nearby road increases, it is more difficult to see the display on a digital signage device 7. However, the central server 5 can determine a probability that an occupant of a vehicle passing along a nearby road will see the digital signage device 7, and the like based on the vehicle speed information. Accordingly, the central server 5 can specifically predict an effect index (an impression index) corresponding to an impression based on the traffic volume information and the vehicle speed information.

In this embodiment, the occupant number information acquiring unit 5209 acquires occupant number information on the number of occupants of the vehicles passing along a road near each digital signage device 7. Then, the first effect predicting unit 5211 predicts an impression index based on the occupant number information.

Accordingly, the central server 5 can predict the number of occupants of vehicles passing along the nearby road using the occupant number information in addition to the traffic volume information. Accordingly, the central server 5 can predict an effect index (an impression index) corresponding to an impression with high accuracy based on the occupant number information in addition to the traffic volume information and the vehicle speed information.

In this embodiment, the vehicle movement information storage processing unit 5202 collects a vehicle movement history including position information from each of a plurality of probe vehicles (vehicles 3). The terminal movement information storage processing unit 5203 collects a terminal movement history including position information from a mobile terminal 4 of each of a plurality of users who use one of a plurality of vehicles 3. The passing vehicle identifying unit 5207 identifies the vehicles 3 passing along a road near each digital signage device 7 among the plurality of vehicles 3 based on the vehicle movement histories. The passing vehicle identifying unit 5207 identifies users boarding the vehicles 3 passing along the road near the digital signage device 7 based on the vehicle movement histories of the vehicles 3 and the terminal movement histories of the mobile terminals 4 of the users of the vehicles 3. Then, the traffic condition related information acquiring unit 5208 acquires traffic volume information including the number of vehicles 3 passing along a road near each of the plurality of digital signage devices 7 based on the identification results from the passing vehicle identifying unit 5207. The occupant number information acquiring unit 5209 acquires occupant number information including the number of occupants of the probe vehicles passing along a road near each of the plurality of digital signage devices 7 based on the identification results from the boarding ascertaining unit 5206.

Accordingly, the central server 5 can specifically acquire traffic volume information including the number of vehicles 3 passing along a road near each digital signage device 7 based on movement histories (vehicle movement histories)

of the plurality of vehicles 3. The central server 5 can specifically acquire occupant number information including the number of users boarding the vehicles 3 passing along the road near the digital signage device 7 by comparing the vehicle movement histories of the vehicles 3 with the terminal movement histories of the mobile terminals 4 of the users of the vehicles 3. Accordingly, the central server 5 can specifically predict an effect index corresponding to an impression with higher accuracy based on the traffic volume information and the occupant number information which are acquired in this way.

In this embodiment, the signage information acquiring unit 5210 acquires conspicuousness information on conspicuousness when each of a plurality of digital signage devices 7 is seen from the corresponding vehicle on a nearby road. Then, the first effect predicting unit 5211 predicts an impression index based on the conspicuousness information.

Accordingly, the central server 5 can acquire information on conspicuousness (conspicuousness information) when a digital signage device 7 is seen from a vehicle such as information (display direction information) on a relationship between a traveling direction of a vehicle on a nearby road and a direction of the display surface of the digital signage device 7. Accordingly, the central server 5 can determine a probability that a vehicle passing along the nearby road will see the advertisement information of the digital signage device 7, and the like based on the conspicuousness information. Accordingly, the central server 5 can specifically predict an effect index (an impression index) corresponding to an impression with higher accuracy based on the conspicuousness information in addition to the traffic volume information and the vehicle speed information.

In this embodiment, the terminal information DB 5200C stores predetermined attribute information of a plurality of users and the attribute information acquiring unit 5212 acquires the attribute information of the users of the vehicles 3 passing along the nearby road from the terminal information DB 5200C. The second effect predicting unit 5213 predicts an audience attribute index of advertisement information displayed on each of a plurality of digital signage devices 7, which is associated with appropriateness of audience attributes over a predetermined display period, based on the attribute information acquired by the attribute information acquiring unit 5212. When the audience attribute index of one piece of advertisement information which is displayed on one digital signage device 7 of a plurality of digital signage devices 7 and which is predicted by the second effect predicting unit 5213 is less than a predetermined second standard, the advertisement delivering unit 5214 changes a destination on which the one piece of advertisement information is displayed from the one digital signage device 7 to another digital signage device 7 in which the audience attribute index of the one piece of advertisement information predicted by the second effect predicting unit 5213 is equal to or greater than a second standard among the plurality of digital signage devices 7.

Accordingly, the central server 5 can identify users who board vehicle 3 passing along a road near each digital signage device 7 based on the vehicle movement histories of the vehicles 3 and the terminal movement histories of the mobile terminals carried by the users of the vehicles 3, and acquire attribute information (for example, sex and age) of the users. Accordingly, the central server 5 can predict an effect index of one piece of advertisement information displayed on one digital signage device 7, which is associated with appropriateness of audience attributes, based on the attribute information of the users of the vehicles 3 passing along the road near the one digital signage device 7, and transfer a display destination of the one piece of advertisement information to another digital signage device 7 when the predicted effect index is less than an expected standard. Accordingly, it is possible to restrain deterioration in advertising effect associated with appropriateness of audience attributes and to achieve an appropriate effect for an advertisement displayed on the digital signage device 7.

In this embodiment, both the impression index and the audience attribute index are predicted, but only one index may be predicted and it may be determined whether to transfer advertisement information depending on whether the predicted one is less than a predetermined standard (target).

Second Embodiment

A second embodiment will be described below.

An advertisement delivery system 1 according to this embodiment is different from the advertisement delivery system according to the first embodiment, in that transfer of advertisement information is performed based on a variation in traffic information without predicting an effect index (such as an impression index) of advertisement information. Specifically, the advertisement delivery system 1 is different from the advertisement delivery system 1 according to the first embodiment, in that a plurality of mobile terminals 4 are omitted. The advertisement delivery system 1 is different from the advertisement delivery system according to the first embodiment, in that the terminal movement information storage processing unit 5203, the boarded vehicle extracting unit 5204, the used vehicle identifying unit 5205, the boarding ascertaining unit 5206, the occupant number information acquiring unit 5209, the signage information acquiring unit 5210, the first effect predicting unit 5211, the attribute information acquiring unit 5212, the second effect predicting unit 5213, the terminal information DB 5200C, the terminal movement history DB 5200G, and the used vehicle DB 5200I are omitted in the processor 52 of the central server 5 and a traffic condition change analyzing unit 5215 is added. In the following description, the same or corresponding elements as in the first embodiment will be referred to by the same reference signs and elements different from those of the first embodiment will be mainly described below.

[Configuration of Advertisement Delivery System]

Figure 10:
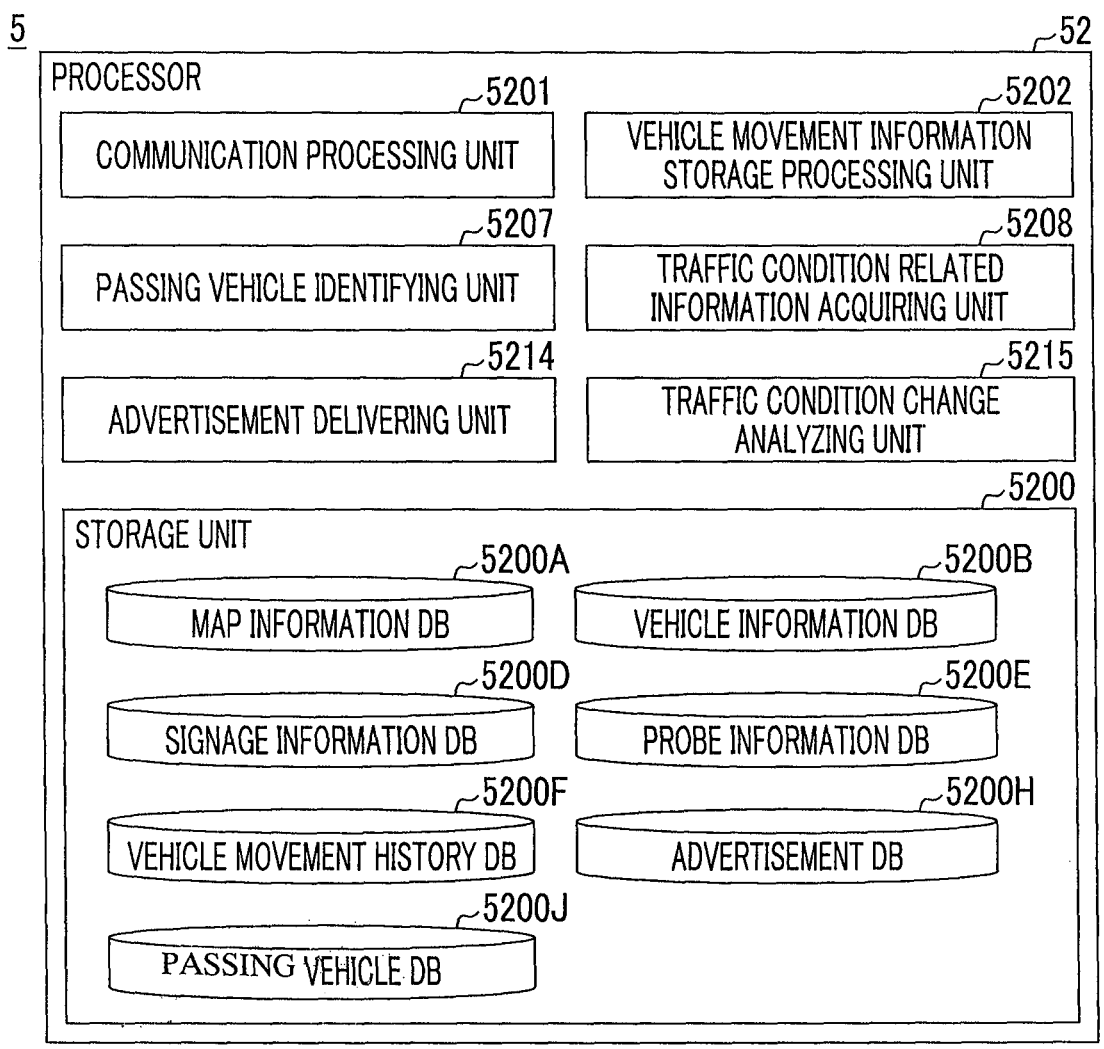
FIG. 10 is a functional block diagram illustrating an example of a functional configuration of a central server according to the second embodiment.

First, a configuration of the advertisement delivery system 1 according to this embodiment will be described below with reference to FIGS. 9 and 10.

FIG. 9 is a diagram schematically illustrating an example of the configuration of the advertisement delivery system 1 according to this embodiment. FIG. 10 is a diagram illustrating an example of a functional configuration of the central server 5 according to this embodiment.

The functional configuration of a vehicle 3 according to this embodiment is the same as illustrated in FIG. 2 in the first embodiment.

The central server 5 includes a communication device 51 and a processor 52 similarly to the first embodiment.

The processor 52 includes a communication processing unit 5201, a vehicle movement information storage processing unit 5202, a passing vehicle identifying unit 5207, a traffic condition related information acquiring unit 5208, a advertisement delivering unit 5214, and a traffic condition change analyzing unit 5215 as functional units which are embodied by causing a CPU to execute one or more program stored in a ROM or an auxiliary storage device. The processor 52 includes, for example, a storage unit 520 which is a storage area defined in an auxiliary storage device of a server computer or an external storage device connected to the server computer. A map information DB 5200A, a vehicle information DB 5200B, a signage information DB 5200D, a probe information DB 5200E, a vehicle movement history DB 5200F, an advertisement DB 5200H, and a passing vehicle DB 5200J are stored in the storage unit 5200.

In this example, since the mobile terminals 4 are omitted, the passing vehicle identifying unit 5207 does not perform a process of ascertaining occupants of vehicles 3 passing along a road near each digital signage device 7. Accordingly, identification information of the vehicles 3 passing along each digital signage device 7 and passing time information are stored in the passing vehicle DB 5200J in correlation with identification information of the corresponding digital signage device 7.

The traffic condition related information acquiring unit 5208 acquires information (traffic volume change information) on change of the number of vehicles 3 passing along each road link in a predetermined area including nearby roads of each digital signage device 7 as traffic condition related information. For example, the traffic condition related information acquiring unit 5208 may calculate the number of vehicles 3 passing along a plurality of road links in a predetermined area every predetermined period (for example, a week) based on the vehicle movement history DB 5200F for each digital signage device 7 and acquire the traffic volume change information.

For example, the traffic condition related information acquiring unit 5208 may access an external road traffic information server via the communication processing unit 5201 and acquire traffic volume change information in a predetermined area including nearby roads of each digital signage device 7 from the road traffic information server.

The traffic condition change analyzing unit 5215 analyzes change in traffic conditions in the vicinity of each digital signage device 7 based on the traffic condition related information acquired by the traffic condition related information acquiring unit 5208. Specifically, the traffic condition change analyzing unit 5215 analyzes change in traffic volume every predetermined time in the area based on the traffic volume change information for each digital signage device 7. More specifically, the traffic condition change analyzing unit 5215 analyzes whether change in traffic volume with a tendency that an impression of advertisement information displayed on the digital signage device 7 deteriorates has occurred. For example, the traffic condition change analyzing unit 5215 determines whether the number of vehicles passing along a road near the digital signage device 7 decreases based on an increase in the number of vehicles passing along a specific road link in a predetermined area including the digital signage device 7 or a curfew or lane restrictions of the nearby road.

The traffic condition related information acquiring unit 5208 may acquire other information as the traffic condition related information which is used for the traffic condition change analyzing unit 5215 to analyze change in traffic volume instead of or in addition to the traffic volume change information. For example, the traffic condition related information acquiring unit 5208 may acquire an accident occurrence information, disaster occurrence information, weather information, new store information, event information, and the like related to accidents, disaster, weather, open of a new store, open of a large-scale event, and the like which affect traffic conditions in an area.

When the traffic condition change analyzing unit 5215 determines that there is change in traffic conditions (traffic volume) with a tendency that an impression of advertisement information exceeds a predetermined range and deteriorates in a predetermined area including the digital signage device 7, the advertisement delivering unit 5214 transfers a display destination of the advertisement information from the digital signage device 7 to another digital signage device 7. For example, the predetermined range which can be considered to be change in traffic conditions may be defined as a change width of the number of vehicles passing along the road links including the nearby road in the area every predetermined period and this information is stored in the storage unit 520 in advance. Details thereof will be described later.

[Details of Operation of Advertisement Delivery System]

A specific operation of the advertisement delivery system 1 according to this embodiment will be described below with reference to FIG. 11.

Figure 11:
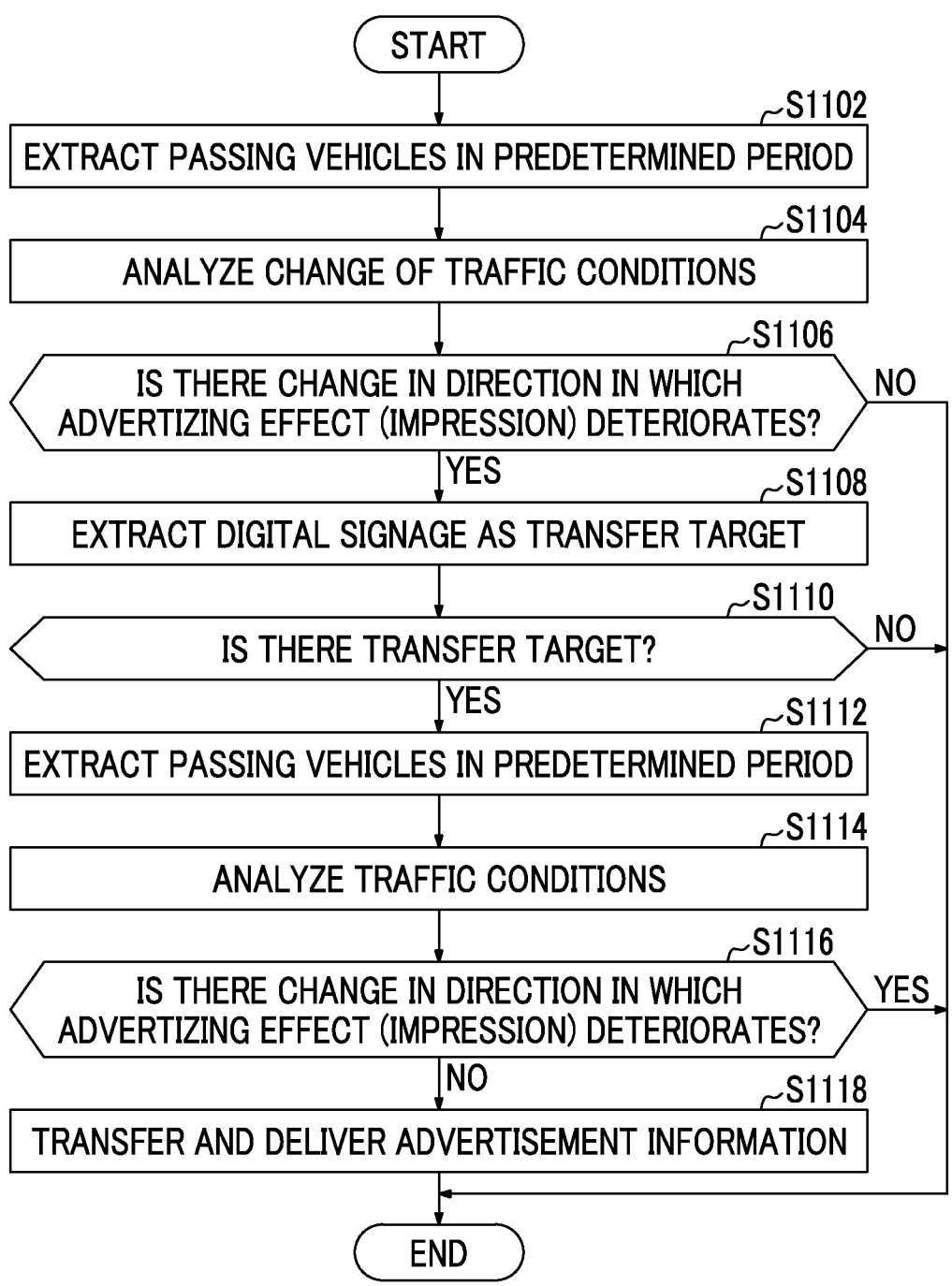
FIG. 11 is a flowchart schematically illustrating an example of a display destination changing process which is performed by the central server according to the second embodiment.

FIG. 11 is a flowchart schematically illustrating an example of a processing routine which is performed by the processor 52 of the central server 5 according to this embodiment.

In Step S1102, the traffic condition related information acquiring unit 5208 acquires traffic volume change information as the traffic condition related information in the vicinity of a target digital signage device 7.

In Step S1104, the traffic condition change analyzing unit 5215 analyzes change in traffic conditions in the vicinity of the digital signage device 7.

In Step S1106, the traffic condition change analyzing unit 5215 determines whether there is change in traffic volume with a tendency that an impression of advertisement information exceeds a predetermined range and deteriorates in a predetermined area including the digital signage device 7. The traffic condition change analyzing unit 5215 performs Step S1108 when there is such change in traffic volume and ends this processing routine when there is no change in traffic volume.

In Step S1108, the advertisement delivering unit 5214 extracts digital signage devices 7 as a transfer destination to which the advertisement information displayed on the digital signage device 7 can be transferred among a plurality of digital signage devices 7.

In Step S1110, the advertisement delivering unit 5214 determines whether there is a digital signage device 7 as a transfer destination. The advertisement delivering unit 5214 performs Step S1112 when there is a digital signage device 7 as a transfer destination, and ends this processing routine when there is no digital signage device 7 as a transfer destination.

When there are a plurality of digital signage devices 7 as a transfer destination, the processes of Steps S1112 to S1116 are performed in parallel on the digital signage devices 7 as a transfer destination.

In Step S1112, the traffic condition related information acquiring unit 5208 acquires traffic volume change information as the traffic condition related information in the vicinity of the digital signage device 7 as a transfer destination.

In Step S1114, change in traffic conditions in the vicinity of the digital signage device 7 as a transfer destination is analyzed.

In Step S1116, the traffic condition change analyzing unit 5215 determines whether there is change in traffic volume with a tendency that an impression of advertisement information exceeds a predetermined range and deteriorates in a predetermined area including the digital signage device 7 as a transfer destination. The traffic condition change analyzing unit 5215 performs Step S1118 when there is no change in traffic volume, and ends this processing routine when there is such change in traffic volume.

In Step S1118, the advertisement delivering unit 5214 transfers and delivers the advertisement information to the digital signage device 7 which is installed in an area in which there is no change in traffic volume with a tendency that the impression of the advertisement information exceeds a predetermined range and deteriorates and ends this processing routine. Here, when there are a plurality of digital signage devices 7 which are installed in areas in which there is no change in traffic volume with a tendency that the impression of the advertisement information exceeds a predetermined range and deteriorates, the advertisement delivering unit 5214 may transfer and deliver the advertisement information to the digital signage device 7 which is installed in an area in which a smallest change width in traffic conditions, that is, in which traffic conditions are stable. In this case, the advertisement delivering unit 5214 may transfer and deliver the advertisement information to the digital signage device 7 which is installed in an area in which there is change in traffic volume with a tendency that an impression is improved and the change width thereof is the largest.

[Operation]

As described above, in this embodiment, the traffic condition related information acquiring unit 5208 acquires traffic condition related information on traffic conditions in the vicinity of each of a plurality of digital signage devices 7. The advertisement delivering unit 5214 changes the digital signage device 7 on which advertisement information is displayed among the plurality of digital signage devices 7 based on the traffic condition related information.

Accordingly, the central server 5 can ascertain, for example, change in traffic conditions of a road near a digital signage device 7 from the traffic condition related information. Accordingly, when the traffic conditions of nearby roads of the digital signage device 7 departs from a range in which an effect is expected to be improved or the like, the central server 5 can transfer the advertisement information on which the digital signage device 7 to another digital signage device 7. Accordingly, it is possible to restrain deterioration in advertising effect and to achieve an appropriate effect for an advertisement displayed on the digital signage device 7.

Specifically, the traffic condition change analyzing unit 5215 analyzes change in traffic conditions in a predetermined area including the digital signage device 7 based on the traffic volume change information acquired by the traffic condition related information acquiring unit 5208. When the traffic condition change analyzing unit 5215 determines that there is change in traffic volume with a tendency that an impression of the advertisement information exceeds a predetermined range and deteriorates, the advertisement delivering unit 5214 transfers a destination in which the advertisement information is displayed from the digital signage device 7 to another digital signage device 7.

Accordingly, specifically, when change in traffic conditions such that an impression deteriorates has been ascertained, advertisement information can be transferred to another digital signage device 7. Accordingly, specifically, it is possible to restrain deterioration in advertising effect and to achieve an appropriate effect for an advertisement displayed on the digital signage device 7.

In this embodiment, the traffic condition change analyzing unit 5215 determines whether there is change in traffic conditions with a tendency that an impression exceeds a predetermined range and deteriorates, but may predict such a tendency in advance. That is, the traffic condition change analyzing unit 5215 predicts whether there is change with a tendency that an impression exceeds a predetermined range and deteriorates based on the traffic volume change information. When such change is predicted by the traffic condition change analyzing unit 5215, the advertisement delivering unit 5214 may perform the above-mentioned transfer of advertisement information. Accordingly, it is possible to complete transfer to a target digital signage device 7 on h advertisement information is displayed before an impression thereof deteriorates from a predetermined range.

While embodiments of the disclosure have been described above, the disclosure is not limited to any specific embodiment and can be modified and changed in various forms without departing from the gist of the disclosure described in the appended claims.

For example, the first embodiment and the second embodiment may be combined. Specifically, the predicted audience attribute index in the first embodiment and the result of analysis of change in traffic conditions on an impression in the second embodiment may be combined to perform transfer of advertisement information. For example, the advertisement delivering unit 5214 may perform the transfer of advertisement information when the determination result of Step S510 of FIG. 5 associated with only the predicted audience attribute index is YES or when the determination result of Step S1106 of FIG. 11 associated with the analysis of change in traffic conditions is YES. Specifically, in the flowchart illustrated in FIG. 5, Steps S502, S504, S516, and S518 are replaced with Steps S1102, S1104, S1112, and S1114 in FIG. 11 and Steps S1106 and S1116 in FIG. 11 are inserted before or after Steps S510 and S524. When the determination result of Step S510 associated with only the predicted audience attribute index or the determination result of Step S1106 is YES, Step S512 is performed. When the determination result of Step S524 associated with only the predicted audience attribute index is YES or when the determination result of Step S1116 is NO, Step S526 is performed.

In the above-mentioned embodiments, Equation (1) is used to predict an impression index, but may be used, for example, to calculate an impression index of advertisement information of which the display period expires later. Accordingly, the equation can be used to plan a strategy such as selection of a digital signage device 7 which serves as a delivery destination in the future.

What is claimed is:

1. A digital signage control device comprising:
a traffic condition related information acquiring unit configured to acquire a traffic condition related information on traffic conditions near each of a plurality of digital signages; and
a display control unit configured to:
cause the plurality of digital signages to display advertisement information, and
switch a digital signage on which the advertisement information is displayed among the plurality of digital signages based on the traffic condition related information.

2. The digital signage control device according to claim 1, further comprising:
a first effect predicting unit configured to calculate a first effect index value indicating an impression of advertisement information displayed on each of the plurality of digital signages over a predetermined display period based on the traffic condition related information, wherein the display control unit is configured to switch, when the first effect index value of first advertisement information displayed on a first digital signage is less than a predetermined first standard, a digital signage on which the first advertisement information is displayed from the first digital signage to a second digital signage, the first digital signage and the second digital signage being included in the plurality of digital signages, the first effect index value of the first advertisement information displayed on the second digital signage being greater than the first effect index value of the first advertisement information displayed on the first digital signage.

3. The digital signage control device according to claim 2, wherein the traffic condition related information acquiring unit is configured to acquire the traffic condition related information including traffic volume information of a nearby road which is a road near each of the plurality of digital signages and vehicle speed information of vehicles passing along the nearby road, and the first effect predicting unit is configured to calculate the first effect index value based on the traffic volume information and the vehicle speed information.

4. The digital signage control device according to claim 3, further comprising:

an occupant number information acquiring unit configured to acquire occupant number information on the number of occupants of a vehicle passing along the nearby road, wherein the first effect predicting unit is configured to calculate the first effect index value based on the occupant number information.

5. The digital signage control device according to claim 4, further comprising:

a vehicle movement history collecting unit configured to collect a vehicle movement history including position information from each of a plurality of probe vehicles;

a terminal movement history collecting unit configured to collect a terminal movement history including position information from a mobile terminal carried by each of a plurality of users of the plurality of probe vehicles;

a passing vehicle identifying unit configured to identify a probe vehicle passing along the nearby road among the plurality of probe vehicles based on the vehicle movement history; and an occupant identifying unit configured to identify an occupant of the probe vehicle passing along the nearby road based on the vehicle movement history of the probe vehicle and the terminal movement history of the mobile terminal of the user of the probe vehicle, wherein the traffic condition related information acquiring unit is configured to acquire the traffic volume information including the number of probe vehicles passing along the nearby road based on an identification result from the passing vehicle identifying unit, and the occupant number information acquiring unit is configured to acquire the occupant number information including the number of occupants of the probe vehicle passing along the nearby road based on an identification result from the occupant identifying unit.

6. The digital signage control device according to claim 3, further comprising:

a conspicuousness information acquiring unit configured to acquire conspicuousness information on conspicuousness when each of the plurality of digital signages is seen from the vehicle on the nearby road corresponding to the each of the plurality of digital signages, wherein the first effect predicting unit is configured to calculate the first effect index value based on the conspicuousness information.

7. The digital signage control device according to claim 1, further comprising:

a vehicle movement history collecting unit configured to collect a vehicle movement history including position information from each of a plurality of probe vehicles;

a terminal movement history collecting unit configured to collect a terminal movement history including position information from a plurality of mobile terminals carried by each of a plurality of users of the plurality of probe vehicles;

an attribute information storing unit configured to store predetermined attribute information of each of the plurality of users;

a passing vehicle identifying unit configured to identify a probe vehicle passing along a nearby road which is a road near each of the plurality of digital signages among the plurality of probe vehicles based on the vehicle movement history;

an occupant identifying unit configured to identify an occupant of the probe vehicle passing along the nearby road based on the vehicle movement history of the probe vehicle and the terminal movement history of the mobile terminal of the user of the probe vehicle;

an attribute information acquiring unit configured to acquire the attribute information of the user identified by the occupant identifying unit from the attribute information storing unit; and a second effect predicting unit configured to calculate, based on the attribute information acquired by the attribute information acquiring unit, a second effect index value indicating appropriateness of audience attributes for advertisement information displayed on each of the plurality of digital signages over a predetermined display period, wherein the display control unit is configured to switch, when the second effect index value of third advertisement information displayed on a third digital signage is less than a predetermined second standard, digital signage on which the third advertisement information is displayed from the third digital signage to a forth digital signage, the third digital signage and the forth digital signage being included in the plurality of digital signages, the second effect index value of the third advertisement information displayed on the forth digital signage being greater than the second effect index value of the third advertisement information displayed on the third digital signage.

8. A digital signage control method comprising:

causing a digital signage control device to cause a plurality of digital signages to display advertisement information;

causing the digital signage control device to acquire a traffic condition related information on traffic conditions near each of the plurality of digital signages; and causing the digital signage control device to switch a digital signage on which the advertisement information is displayed among the plurality of digital signages based on the traffic condition related information.

9. A non-transitory computer-readable recording medium storing a program, the program causing a computer to perform:
  displaying advertisement information on a plurality of digital signages;
  acquiring a traffic condition related information on traffic conditions near each of the plurality of digital signages; and
  switching a digital signage on which the advertisement information is displayed among the plurality of digital signages based on the traffic condition related information.

* * * * *